(12) United States Patent
Saito

(10) Patent No.: US 11,157,573 B2
(45) Date of Patent: Oct. 26, 2021

(54) INFORMATION PROCESSING DEVICE, INFORMATION PROCESSING METHOD, PROGRAM AND STORAGE MEDIUM

(71) Applicant: Rakuten Group, Inc., Tokyo (JP)

(72) Inventor: Keita Saito, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 188 days.

(21) Appl. No.: 15/525,088

(22) PCT Filed: Nov. 20, 2014

(86) PCT No.: PCT/JP2014/080775
§ 371 (c)(1),
(2) Date: May 8, 2017

(87) PCT Pub. No.: WO2016/079849
PCT Pub. Date: May 26, 2016

(65) Prior Publication Data
US 2017/0316102 A1    Nov. 2, 2017

(51) Int. Cl.
*G06F 16/9535* (2019.01)
*G06F 16/957* (2019.01)
(Continued)

(52) U.S. Cl.
CPC .......... *G06F 16/9535* (2019.01); *G06F 16/14* (2019.01); *G06F 16/144* (2019.01);
(Continued)

(58) Field of Classification Search
CPC ......... G06F 17/30395; G06F 17/30864; G06F 17/3064; G06F 17/30979; G06F 17/30401;
(Continued)

(56) References Cited

U.S. PATENT DOCUMENTS 8,595,252 B2    11/2013   Wu et al.
9,529,036 B2 *  12/2016   Balog ................ G01R 31/2601
(Continued)

FOREIGN PATENT DOCUMENTS

JP    2013008207 A  *  1/2013
JP    2013-250677 A    12/2013

OTHER PUBLICATIONS

Mostafa: BidTerm Suggestion for Webpages Business Information System Department Arab Academy for Science and Technology, Alexandria, Egypt IEEE Computer Society, Dec. 12, 2012.*
(Continued)

*Primary Examiner* — Tamara T Kyle
*Assistant Examiner* — Berhanu Mitiku
(74) *Attorney, Agent, or Firm* — Sughrue Mion, PLLC

(57) ABSTRACT

An input character into a search keyword input column provided in a web page is received each time a character is inputted. A suggest word that matches the received input character is extracted from suggest word management information in which a plurality of suggest words are stored. Then, for at least one suggest word among the extracted suggest words, a shop associated with a keyword obtained from the suggest word is extracted based on keyword-shop correspondence information in which a keyword and a shop are corresponded to each other. Further, a control is performed to display the extracted suggest word and to display information concerning the extracted shop as a search button for instructing execution of a search that is based on the keyword and targets the shop as a search domain.

11 Claims, 15 Drawing Sheets

(51) Int. Cl.
*G06F 16/14* (2019.01)
*G06F 16/954* (2019.01)
*G06Q 30/06* (2012.01)

(52) U.S. Cl.
CPC .......... *G06F 16/954* (2019.01); *G06F 16/957* (2019.01); *G06Q 30/0641* (2013.01)

(58) Field of Classification Search
CPC .............. G06F 16/9535; G06F 16/957; G06F 16/3323; G06F 16/951; G06Q 30/0641
USPC .......................................... 715/862; 707/767
See application file for complete search history.

(56) References Cited

U.S. PATENT DOCUMENTS

| | | | |
|---|---|---|---|
| 9,529,936 B1 * | 12/2016 | Pankaj | ................ G06F 17/3064 |
| 2007/0043736 A1 * | 2/2007 | Jain | ....................... G06F 16/951 |
| 2013/0073585 A1 * | 3/2013 | Kinugawa | .............. G06Q 30/02 |
| | | | 707/769 |
| 2014/0229229 A1 | 8/2014 | Hirate | |
| 2015/0088637 A1 * | 3/2015 | Muguchi | ............ G06Q 30/0246 |
| | | | 705/14.45 |
| 2016/0005370 A1 * | 1/2016 | Liu | ...................... G09G 3/3406 |
| | | | 345/691 |

OTHER PUBLICATIONS

International Search Report of PCT/JP2014/080775 dated Jan. 13, 2015.

\* cited by examiner

Fig. 6

| SUGGEST WORD | PRONUNCIATION INFORMATION | COUNT OF SEARCH | DISPLAY PRIORITY DEGREE |
|---|---|---|---|
| ... | ... | ... | ... |
| チーズケーキ (CHEESECAKE) | CHIIZUKEEKI | 1400 | Y0001 |
| チーズケーキ 訳あり (CHEESECAKE IMPERFECT) | CHIIZUKEEKI WAKEARI | 384 | Y0002 |
| チーズ削り (CHEESE CARVING) | CHIIZUKEZURI | 61 | Y0003 |
| チーズケーキ オーガニック (CHEESECAKE ORGANIC) | CHIIZUKEEKI OOGANIKKU | 37 | Y0004 |
| ... | ... | ... | ... |
| チーズケーキ 送料無料 (CHEESECAKE FREE SHIPPING) | CHIIZUKEEKI SOURYOUMURYOU | 1208 | Y0012 |
| チーズケーキ アイス (CHEESECAKE ICECREAM) | CHIIZUKEEKI AISU | 15 | Y0013 |
| ... | ... | ... | ... |

Fig. 7

| KEYWORD | SHOP ID |
|---|---|
| チーズケーキ<br>(CHEESECAKE) | TID0001 |
| | TID0002 |
| | ⋮ |
| | TID0009 |
| チーズ削り<br>(CHEESE CARVING) | TID0100 |
| | TID0111 |
| | ⋮ |
| | TID0130 |
| ⋮ | ⋮ |
| トートバッグ<br>(TOTE BAG) | TID0500 |
| | TID0501 |
| | ⋮ |
| | TID0688 |

Fig. 15

| KEYWORD | SUPERORDINATE CONCEPT WORD | SHOP ID |
|---|---|---|
| チーズケーキ<br>(CHEESECAKE) | CAKE | TID0001 |
| | | TID0002 |
| | | ⋮ |
| | | TID0009 |
| ⋮ | ⋮ | ⋮ |
| ロールケーキ<br>(ROLL) | CAKE | TID0320 |
| | | TID0355 |
| | | ⋮ |
| | | TID0419 |
| トートバック<br>(TOTE BAG) | BAG | TID0500 |
| | | TID0501 |
| | | ⋮ |
| | | TID0688 |

INFORMATION PROCESSING DEVICE, INFORMATION PROCESSING METHOD, PROGRAM AND STORAGE MEDIUM

CROSS REFERENCE TO RELATED APPLICATIONS

This application is a National Stage of International Application No. PCT/JP2014/080775 filed Nov. 20, 2014, the contents of which are incorporated herein by reference in its entirety.

TECHNICAL FIELD

The present invention relates to an information processing device to display a suggest word that matches an input character into a search keyword input column provided in a web page, an information processing method for the information processing device, a program implementing the information processing device, and a recording medium recording the program.

CITATION LIST

Patent Literature

Patent Literature 1: JP 2013-250677 A

BACKGROUND ART

Product search and product purchase through a communication network, such as the Internet, have become prevalent. Under such circumstance, technologies, such as Patent Literature 1, to display a suggest word matching an input character into a search keyword input column provided in a web page have been proposed. For example, when an input character is "wine", "wine wooden box", "wine glass", "wine France", and the like are displayed as suggest words. A blank character positioned between "wine" and "France" is used for Boolean ("AND") search employing a plurality of words. The above suggest word, "wine France" functions as a search query to obtain a search result of a product related to the words, "wine" and "France".

As disclosed in Patent Literature 1, when an arbitrary suggest word is selected from one or a plurality of displayed suggest words, a search employing the selected suggest word as a search query is executed, and a search result page is displayed to a user. Thus, such technologies intend to spare a user a burden of inputting characters when searching for an object product.

On commercial occasions through the Internet, display of information concerning a shop, such as a logo image of the shop, in a web page, is widely conducted. In this case, the information of a displayed shop includes a corresponding link information to a representative page (for example, a front page) of the shop. Accordingly, a user can enjoy shopping at the shop by selecting the information concerning the shop by a click or a similar operation.

SUMMARY OF INVENTION

Technical Problem

Under such situation, for sales improvement, a shop desires an environment where the shop can more easily sell a product that the shop intends to sell. Further, in order to improve sales, it is preferable that an environment where a user as a purchaser can more easily purchase a product is provided.

In view of the above situation, an object of the present invention is to provide an effective electronic commercial environment where a shop can easily sell a product that the shop intends to sell and a user can more easily purchase a product.

Solution to Problem

An information processing device according to the present invention includes an input character receiving unit, a suggest word extracting unit, a shop extracting unit, and a display control unit: The input character receiving unit receives an input character into a search keyword input column provided in a web page each time a character is inputted. The suggest word extracting unit extracts a suggest word matching the input character received by the input character receiving unit, from suggest word management information in which a plurality of suggest words are stored. The shop extracting unit extracts a shop associated with a keyword obtained from at least one suggest word from the suggest words extracted by the suggest word extracting unit, based on keyword-shop correspondence information in which a keyword and a shop are corresponded to each other. And the display control unit controls to display the suggest word extracted by the suggest word extracting unit and to display information concerning the shop extracted by the shop extracting unit, as a search button for instructing execution of a search that is based on the keyword and targets the shop as a search domain.

With the above configuration, in addition to a conventional function having steps of displaying suggest words, selecting one suggest word, and displaying a search result page based on the suggest word, a function having steps of displaying shops corresponded to displayed suggest words, selecting one shop, and displaying a search result page employing the suggest word and targeting the selected shop as a search domain, is enabled. Since a shop may select any keyword (a suggest word) to be corresponded to the shop itself (that is, a keyword related to a product the shop intends to sell can be selected), an environment where the shop can more easily sell a product that the shop intends to sell can be provided. In other words, more sales opportunities can be provided for the shop. Besides, since information concerning a displayed shop (shop information) functions as a search button to obtain a result of a search based on a suggest word targeting the shop as a search domain, a user can easily get a display of a search result about a desired product in a desired shop, simply by selecting the displayed shop information. Compared with a conventional link to a representative page of the selected shop, a user can more easily purchase a product, since a trouble of inputting characters to search for a desired product is reduced.

Further, in the above information processing device according to the present invention, if a count of shops associated with a keyword obtained from the suggest word is greater than a count of display frames for the information concerning the shop, it is preferable that the shop extracting unit extracts an equal count of shops to the count of display frames, from the shops associated with a keyword obtained from the suggest word.

Accordingly, a greater count of shops than the count of display frames in a web page may be corresponded to one keyword.

Further, in the above information processing device according to the present invention, it is preferable that the shop extracting unit extracts at random an equal count of shops to the count of display frames.

Accordingly, different shops can be displayed to a user at different display occasions.

Further, in the above information processing device according to the present invention, it is preferable that the shop extracting unit extracts respective shops associated with a keyword obtained from each of the plurality of suggest words extracted by the suggest word extracting unit, and that the display control unit controls to display, as the search buttons, respective information concerning the respective shops extracted for each of the plurality of suggest words by the shop extracting unit.

A shop to display may be limited to, for example, a shop corresponded to a suggest word with a top display priority degree. However, a suggest word which a user looks for may rank third in the display priority degree. In such a case, a shop suggestion function is rendered less effective, if displaying only the shop corresponded to the suggest word with the top display priority degree. In this regard, a display of a shop corresponded to each of suggest words increases the likelihood of displaying a shop corresponded to a suggest word a user looks for.

Further, in the above information processing device according to the present invention, it is preferable that the shop extracting unit extracts respective shops associated with a keyword obtained from each of the plurality of suggest words extracted by the suggest word extracting unit, and that the display control unit controls to display the plurality of suggest words, and in response to a user instruction of a suggest word other than a suggest word that displays information concerning a shop among the displayed plurality of suggest words, and controls to display, as the search button, information concerning a shop that is extracted by the shop extracting unit regarding the instructed suggest word Accordingly, instead of fixedly suggesting a shop related to one suggest word among a plurality of displayed suggest words, a shop related to suggest words a user may have interest in is flexibly suggested.

Further, in the above information processing device according to the present invention, it is preferable that the display control unit controls to, along with acquiring a superordinate concept word of a keyword corresponded to a shop extracted by the shop extracting unit, display information concerning the shop extracted by the shop extracting unit, as a search button for instructing execution of a search that is based on the superordinate concept word and targets the shop as a search domain.

Accordingly, when a suggested shop is selected, a search result of products related to the superordinate concept word of a keyword, which includes products related to the keyword, is displayed to a user.

An information processing method according to the present invention causes an information processing device to execute an input character receiving step, a suggest word extracting step, a shop extracting step, and a display control step. The input character receiving step includes receiving an input character into a search keyword input column provided in a web page each time a character is inputted. The suggest word extracting step includes extracting a suggest word matching the input character received at the input character receiving step, from suggest word management information in which a plurality of suggest words are stored. The shop extracting step is to extract a shop associated with a keyword obtained from at least one suggest word from the suggest words extracted at the suggest word extracting step, based on keyword-shop correspondence information in which a keyword and a shop are corresponded to each other. The display control step includes controlling to display the suggest word extracted at the suggest word extracting step and to display information concerning the shop extracted at the shop extracting step, as a search button for instructing execution of a search that is based on the keyword and targets the shop as a search domain.

With such information processing method, as well as with the above information processing device according to the present invention, an environment where a shop can more easily sells a product the shop intends to sell can be provided, and a user can more easily purchase a product.

Further, a program according to the present invention is a program causing an information processing device to execute processing executed as the above information processing method.

Furthermore, a recording medium according to the present invention is a recording medium recording the above program. With the program and the recording medium, the above information processing device is implemented.

Advantageous Effects of Invention

According to the present invention, an effective electronic commercial environment where a shop can easily sell a product that the shop intends to sell and a user can more easily purchase a product can be provided.

BRIEF DESCRIPTION OF THE DRAWINGS

FIG. 6 is a diagram illustrating an example of suggest word management information;

FIG. 7 is a diagram illustrating an example of keyword-shop correspondence information;

Figure 13:
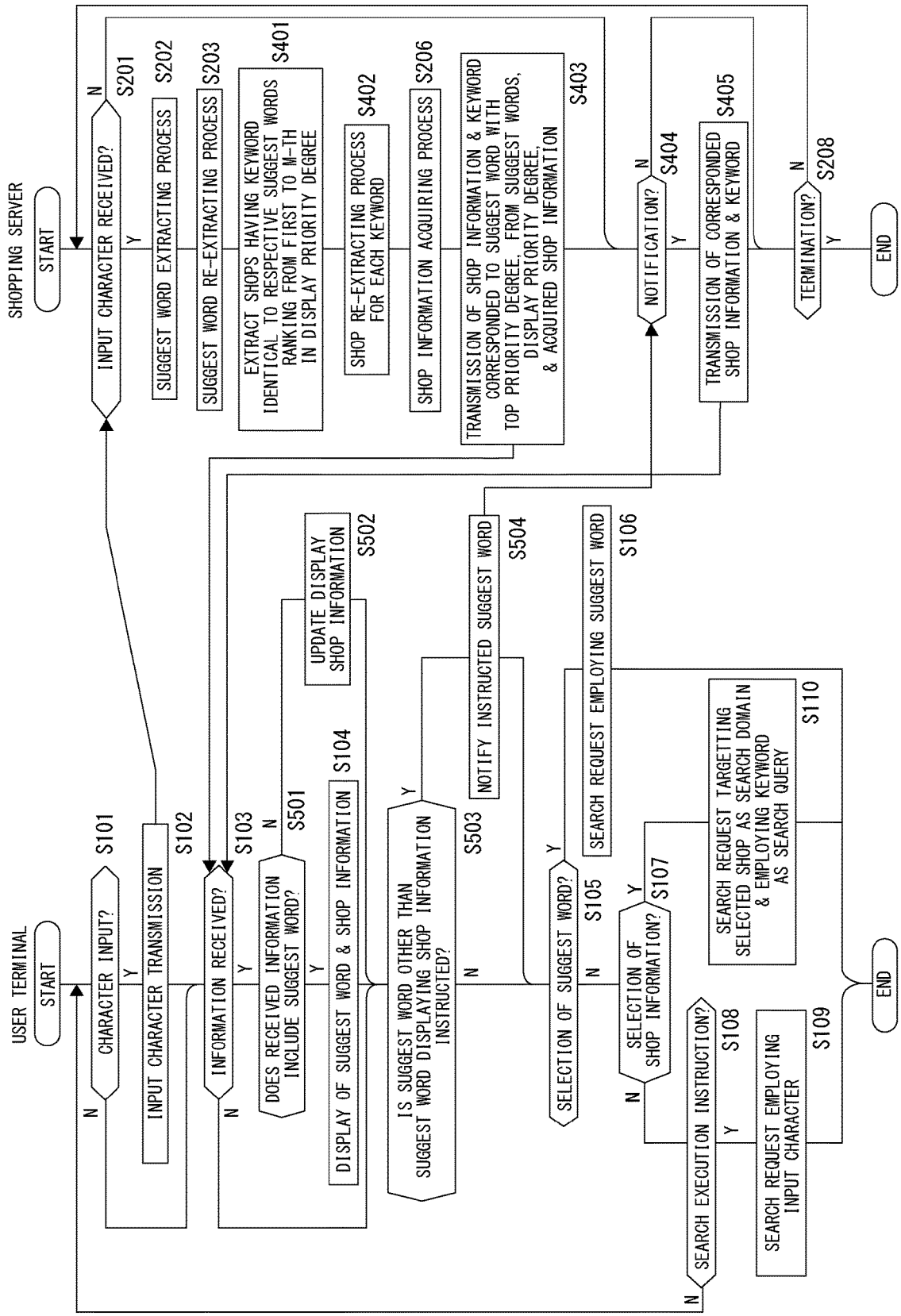
Figure 14:
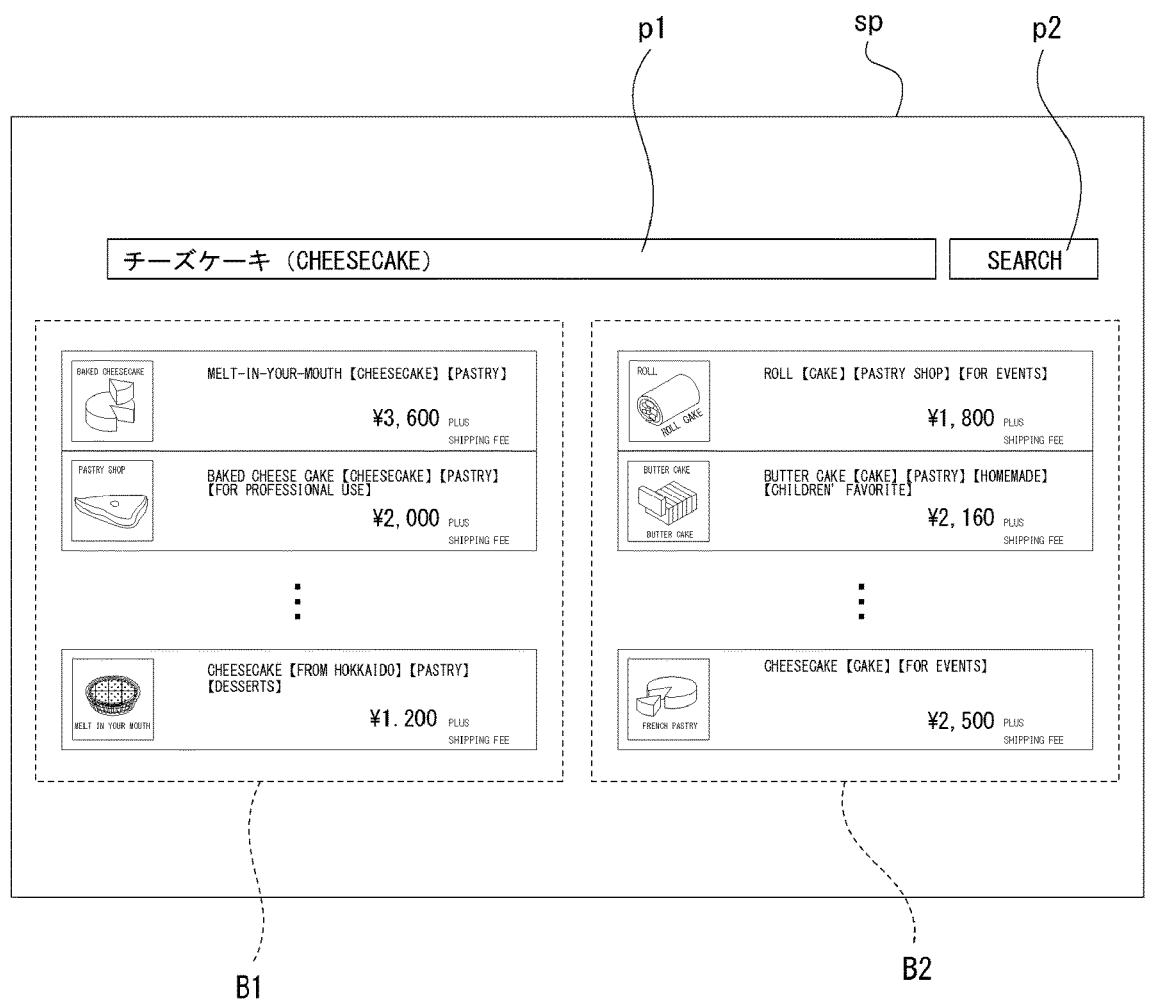
Figure 16:
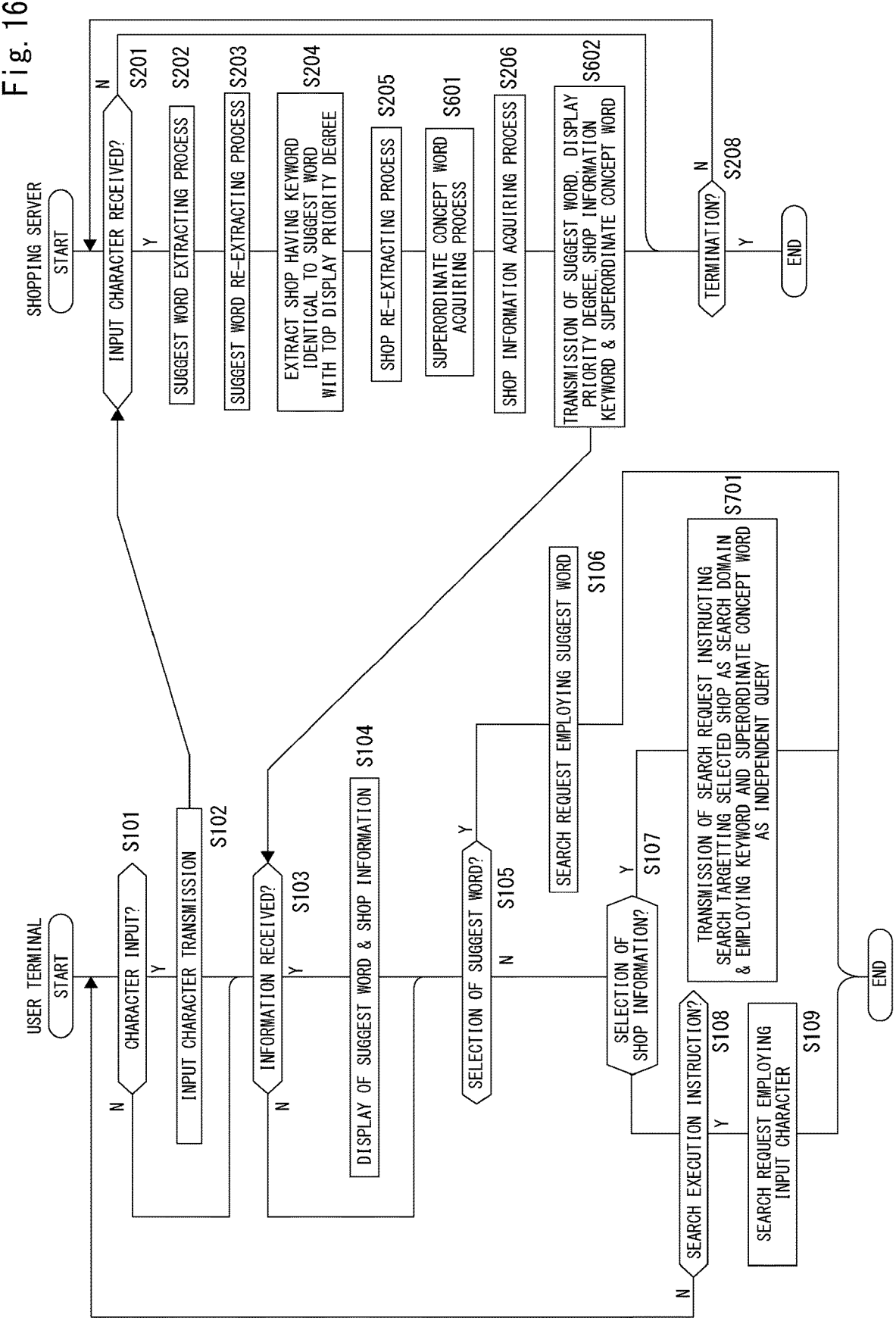

Figures in FIG. 12 are diagrams illustrating a transition example of display information on a web page in response to a suggest word instruction by a user;

FIG. 13 is a flowchart illustrating processing procedure to be conducted to implement functions as a third embodiment;

FIG. 14 is a diagram illustrating an example of a search result page according to a fourth embodiment;

FIG. 15 is a diagram illustrating an example of information where each keyword is corresponded to a superordinate concept word; and FIG. 16 is a flowchart illustrating processing procedure to be conducted to implement functions as the fourth embodiment.

DESCRIPTION OF EMBODIMENTS

The following describes embodiments in the order listed below.
1. First Embodiment
   1-1. Overview of Network System
   1-2. Hardware Configuration of Computer Device
2. Second Embodiment
   2-1. Overview of Functions Included in Information Processing Device According to Second Embodiment
   2-2. Processing Procedure
3. Third Embodiment
   3-1. Overview of Functions Included in Information Processing Device According to Third Embodiment
   3-2. Processing Procedure
4. Fourth Embodiment
   4-1. Overview of Functions Included in Information Processing Device According to Fourth Embodiment
   4-2. Processing Procedure
5. Summary of Embodiments
6. Program and Recording Medium
7. Modifications

1. First Embodiment 1-1. Overview of Network System

Figure 1:
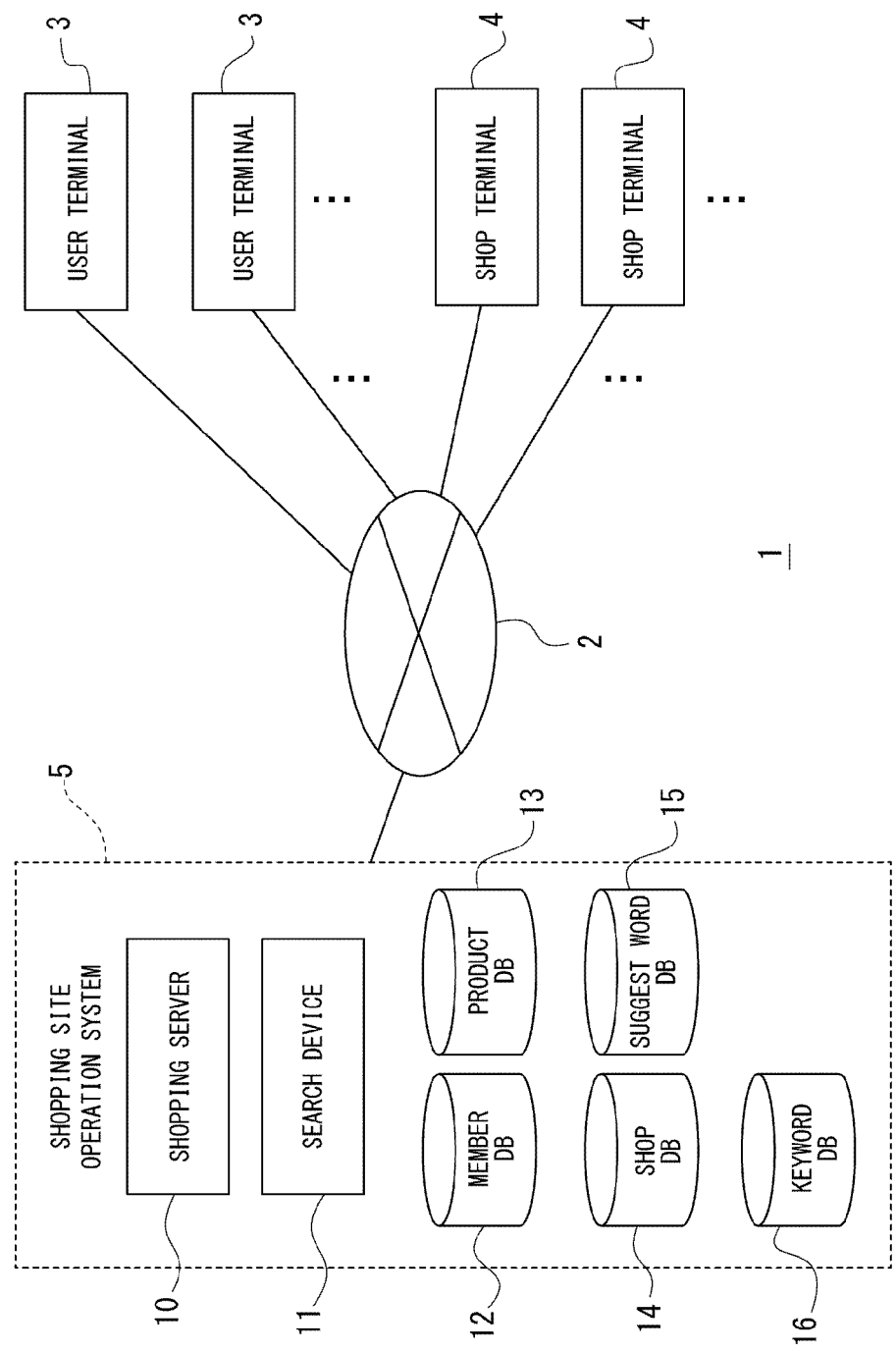
FIG. 1 is a diagram illustrating an example of a network system according to an embodiment.

FIG. 1 illustrates an example of a network system 1 assumed in the present embodiment. The network system 1 functions as an EC (electronic commerce) system.

The network system 1 is formed of a shopping site operation system 5, a plurality of user terminals 3, 3 . . . , and a plurality of shop terminals 4, 4 . . . , each of which is mutually communicable through a network 2, for example, the Internet and the like.

The user terminal 3 is a computer device including a web browser. The user terminal 3 may be, for example, a high function mobile phone (a smartphone), a mobile phone, a portable digital assistant (PDA), or a laptop or desktop computer. However, a type of the user terminal 3 is not limited to these devices.

The user terminal 3 requests a web page and a predetermined process, by transmitting an HTTP (HyperText Transfer Protocol) request to the shopping site operation system 5 (particularly, a shopping server 10 and a search device 11, which will be described later). Besides, the user terminal 3 receives a web page transmitted in response to the HTTP request and displays the web page in a web browser. Thus, a user (the user of the shop terminal 3) can view and manipulate a desired web page.

The shopping sire operation system 5 includes a shopping server 10, a search device 11, a member DB (database) 12, a product DB 13, a shop DB 14, a suggest word DB 15, and a keyword DB 16, each of which is configured of a computer device. Each of these devices is mutually communicable through a network, such as a LAN (Local Area Network).

The shopping server 10 performs various processing according to an HTTP request transmitted from the user terminal 3. For example, the shopping server 10 generates and transmits various web pages (for example, a product web page, a shopping cart web page, and an order web page) and conducts order processing and the like in response to an order placement operation by a user.

In the network system 1, a web site of a virtual shopping mall (a shopping site) is provided for a user by the shopping server 10. A plurality of shops (member shops of the virtual shopping mall) exist in the shopping site. A staff member at each shop registers a product of his/her shop in the shopping site operation system 5 (for example, the shopping server 10) through a computer device as the shop terminal 4, so that a variety of products of diverse shops are uploaded to the shopping site. Through the user terminal 3, a user can access the shopping site and purchase a desired product.

For using the shopping site, a user can register for a membership in the shopping site operation system 5. At membership registration, a user registers required information, such as a user ID (user identification information), a shipping address of a product (residential address information), a credit card number, and the like. Login to the shopping site with a registered ID saves a user a trouble of inputting required information again when purchasing a product at the shopping site.

The member DB 12 stores information to be managed for each member, such as information registered at the time of above-described membership registration, for example, a user ID and the like. The information stored in the member DB 12 is, for example, personal information of a member (such as a name, an age, a date of birth, a gender, and a residential address) and the like. Further, browsing history information, product purchase history information and the like of a product web page for each member may be stored in the member DB 12.

In a web page provided by the shopping server 10, an input column to input a search keyword for product search is provided as a search bar ("a search bar p1", which will be described later). A user can input a keyword for a search in the search bar. A search button ("a search button p2", which will be described later) is placed near the search bar. A user can perform execution instruction for a search based on an input keyword into the search bar, by operating the search button. In response to the execution instruction, the user terminal 3 transmits to the search device 11 a search request specifying the input keyword as a search query.

The search device 11 functions as a so-called search engine. Based on a specified query by the search request, the search device 11 searches for a product web page related to the query among one or a plurality of the product web pages stored in the product DB 13, and transmits a web page showing a search result, to the user terminal 3 that has transmitted the search request.

In the product DB 13, product information such as a product name, a type, a product image, a specification, and a summary of a product introduction, and advertisement information and the like are corresponded to a product ID, which is an identifier to distinguish among products, and stored. In addition, a product web page file and the like, which are written in a markup language or a similar language such as HTML (HyperText Markup Language) and XML (Extensible Markup Language), are stored in the product DB13.

Based on the above product information stored in the product DB 13 and character information (text information) included in the product web page file, and the like, the search device 11 searches for a product web page related to a received query, for example, a product web page including identical text information to the query.

As will be described later, in the network system 1 according to the present embodiment, when a character is inputted to a search bar in a web page provided by the shopping server 10, a suggest word matching an input character into the search bar is displayed in the web page. For example, as a match for an input character "cheese", suggest words such as "cheesecake" and "cheesecake free shipping" are displayed.

When an arbitrary suggest word is selected by a user among the displayed suggest words, the user terminal 3 submits to the search device 11 a search request specifying the selected suggest word as a search query. Then, the search device 11 transmits a search result page showing a result of the search to the user terminal 3.

Thus, regarding a search keyword a user intends to input, the user can instructs a search based on the search keyword, without inputting all the characters in the keyword. Thus, a burden of inputting characters is reduced for a user when searching for a desired product.

As understood from above description, a suggest word is a word or a phrase displayed in response to character input to a search bar (an input column), and related to an input character into the search bar.

The suggest word DB 15 is a computer device storing information to which the shopping server 10 refers when displaying a suggest word as described above ("suggest word management information I1", which will be described later).

Further details will be described later. Derails on the keyword DB 16 will also be described later.

In the shopping DB 14, registration information concerning a member shop of a virtual shopping mall implemented by a shopping site is stored. The registration information concerning a member shop includes a shop ID for distinguishing between shops, name information of a shop, genre information to which a shop belongs, a logo image of the shop, and the like.

Registration procedure of a shop is conducted to the shopping site operation system 5, for example, by an operator of the shopping site operation system 5, a shop staff member or a similar person. In the shop DB 14, information registered along with the registration procedure is stored as the above registration information.

A case where the user terminal 3 submits a search request to the search device 11, and then a search is conducted with an input keyword or a selected suggest word as a query is described above. However, a configuration where the user terminal 3 submits to the shopping server 10 an input keyword or a selected suggest word as a search query, and then the search device 11 conducts a search based on the query, which is transmitted from the user terminal 3 via the shopping server 10, may be conceivable. In this case, the shopping server 10 may receive search result information from the search device 11, generate a web page showing a search result based on the received search result information, and then transmit the generated web page to the user terminal 3.

In FIG. 1, configuration of the network 2 is not particularly limited. Other than the above-described Internet, for example, an intranet, an extranet, a LAN, a CATV (Community Antenna TeleVision) communication network, a Virtual Private Network, a telephone line network, a mobile communication network, a satellite network, and the like may be conceivable.

Various examples are also conceivable for a communication medium that forms the whole or a part of the network 2. For example, wired media such as an IEEE (Institute of Electrical and Electronics Engineers) 1394, a USB (Universal Serial Bus), power line transmission, a telephone line, and the like, and wireless media such as infrared, like IrDA (Infrared Data Association), a Bluetooth (R), 802.11 wireless, a mobile telephone network, a satellite line, a digital terrestrial network, and the like, may also be available.

These conditions also apply to the network that enables communications between devices forming the shopping site operation system 5.

1-2. Hardware Configuration of Computer Device

Figure 2:
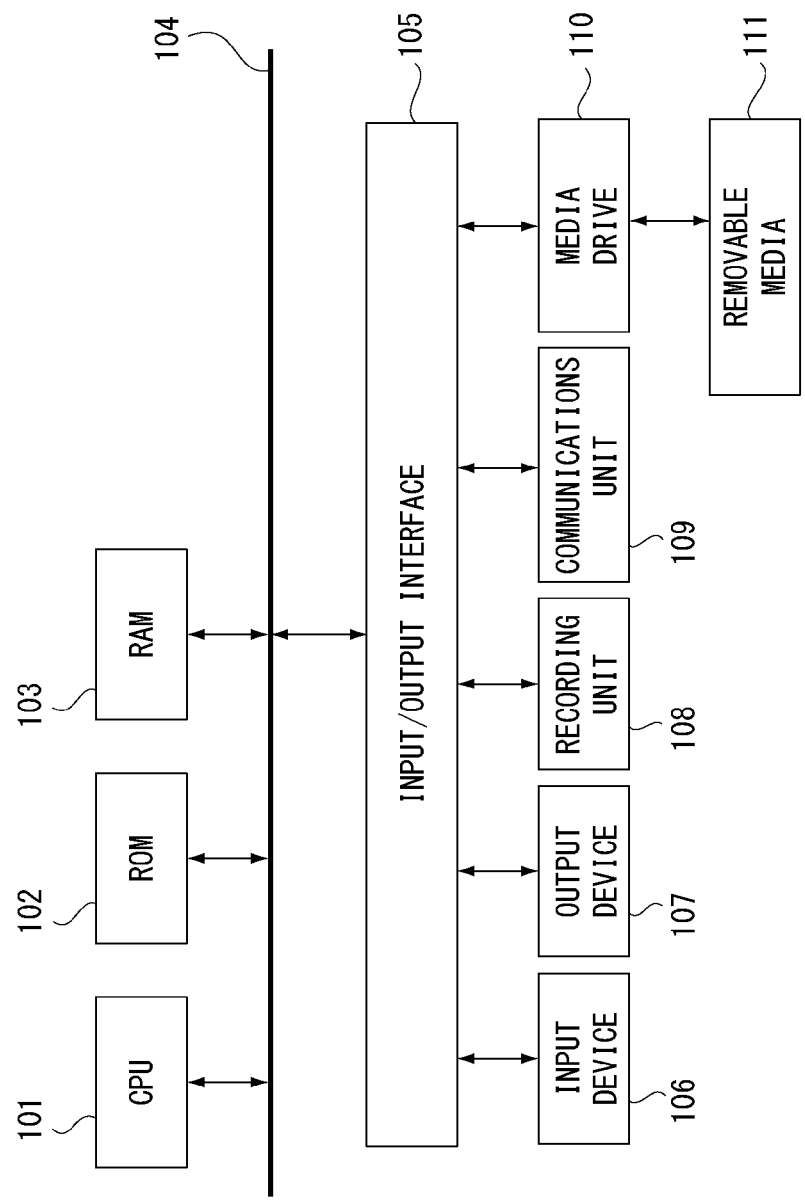
FIG. 2 is a block diagram illustrating a hardware configuration of a computer device forming a network system according to an embodiment.

FIG. 2 illustrates a hardware configuration of a computer device forming each of the devices described in FIG. 1, specifically, the shopping server 10, the search device 11, the member DB 12, the product DB 13, the shop DB 14, the suggest word DB 15, the keyword DB 16, the user terminal 3, and the shop terminal 4.

In FIG. 2, a Central Processing Unit (CPU) 101 of a computer device performs various processes according to a program stored in a Read Only Memory (ROM) 102 or a program loaded from a storage unit 108 to a Random Access Memory (RAM) 103. Data required for the CPU 101 to perform various processes and the like are also stored in the RAM 103 as appropriate.

The CPU 101, the ROM 102, and the RAM 103 are connected to each other via a bus 104. An input/output interface 105 is also connected to the bus 104.

An input device 106, an output device 107, the recording unit 108, and a communications unit 109 are connected to the input/output interface 105. The input device 106 includes a keyboard, a mouse, a touch panel, and the like. The output device 107 includes a display (a display device) including an LCD (Liquid Crystal Display), a CRT (Cathode Ray Tube), an organic EL (Electroluminescence) panel and the like, a speaker, and the like.

The recording unit 108 includes an HDD (Hard Disk Drive), a flash memory device, and the like. The communications unit 109 is for mutual communication with an external device.

In addition, a media drive 110 is connected to the input/output interface 105 as necessary. A removable medium 111 such as a magnetic disk, an optical disk, a magneto-optical disk, and semiconductor memory is mounted as necessary, so that information can be written on and read from the removable medium 111.

The above computer device is capable of uploading and downloading data and a program through communications by the communications unit 109, and also of transmitting and receiving data and a program through the removable medium 111.

The CPU 101 performs process operations according to various programs, so that information processing and communications as will be described later can be executed, especially in a computer device as the shopping server 10.

Figure 3:
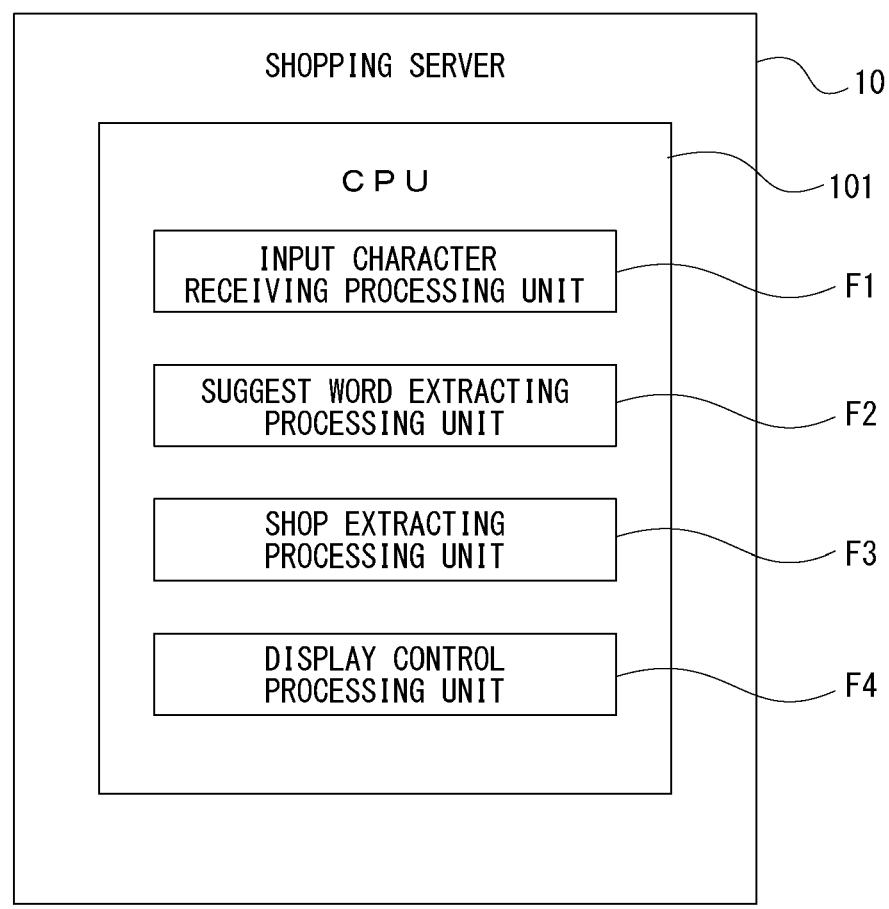
FIG. 3 is a functional block diagram illustrating functions concerning an embodiment as blocks.

1-3. Respective Functions Included in Information Processing Device According to First Embodiment FIG. 3 is a functional block diagram, illustrating functions concerning the embodiments as blocks, among the functions included in the CPU 101 of the shopping server 10.

As illustrated, the CPU 101 of the shopping server 10 includes functions as an input character receiving processing unit F1, a suggest word extracting processing unit F2, a shop extracting processing unit F3, and a display control processing unit F4.

The input character receiving processing unit F1 receives an input character into a search keyword input column provided in a web page each time a character is inputted. Specifically, the input character receiving processing unit F1 receives, from the user terminal 3, a character a user has inputted into the search bar p1 provided in a web page wp, each time a character is inputted. The webpage wp is transmitted to the user terminal 3 by the shopping server 10 in response to a request.

Figure 4:
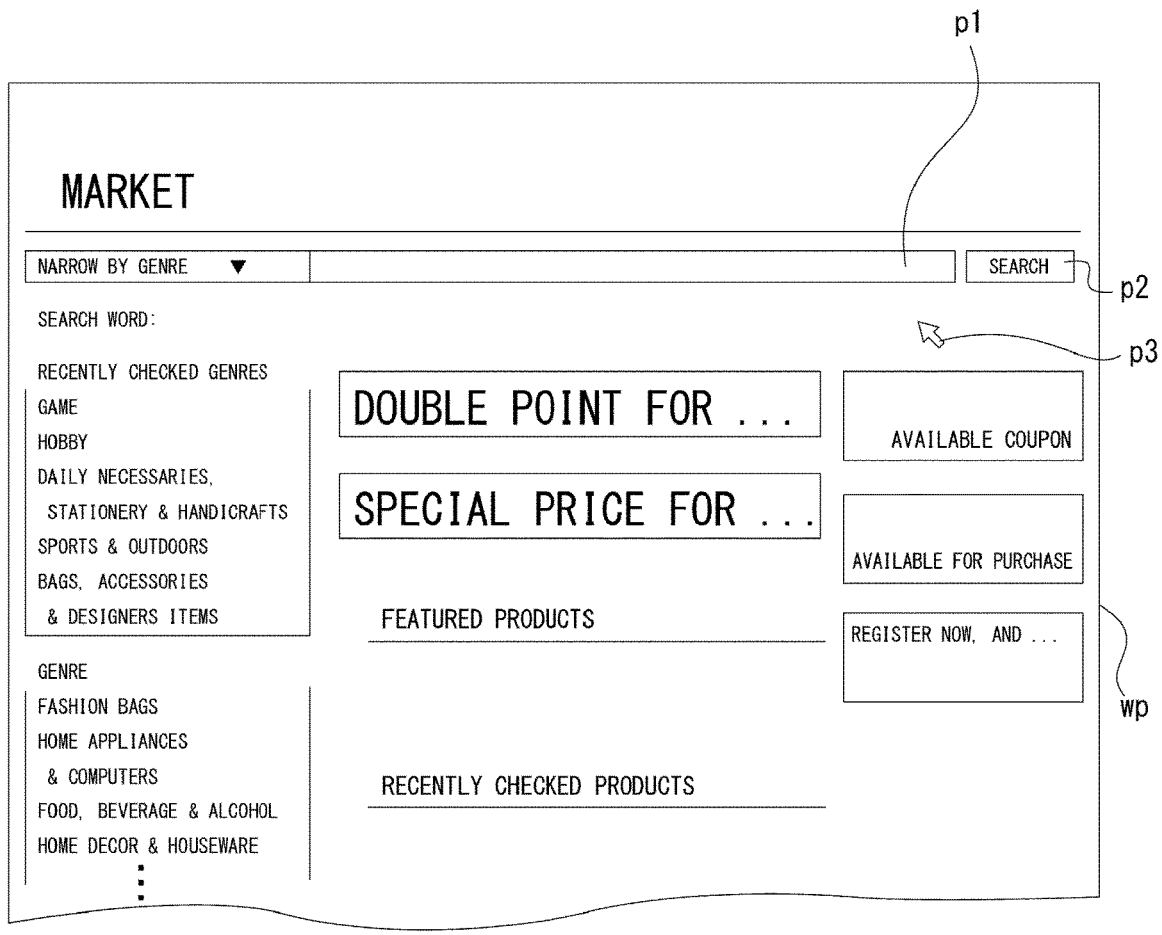
FIG. 4 is a diagram illustrating an example of a web page.

FIG. 4 illustrates an example of the web page wp.

In the web page wp, with an input column to input a search keyword for a product search as the search bar p1 being provided, a search button p2 is placed near the search bar p1.

After inputting a character into the search bar p1, a user can conduct an execution instruction of a search specifying an input character into the search bar p1 as a query, by a selection operation of the search button p2. Specifically, as the selection operation, a mouse click operation may be performed while a pointer p3 is positioned over the search button p2 by a mouse operation.

When input through a touch panel operation is possible, an operation to instruct search execution may be a touch operation on the search button p2, in a predetermined manner. Alternatively, an operation to instruct search execution may be a pressing operation on a predetermined key, such as an Enter key, on a keyboard.

In this example, the user terminal 3 transmits to the shopping server 10 an input character into the search bar p1, each time a character is inputted into the search bar p1. For example, assume a case where characters "w" and "q" are inputted in this order into the search bar p1. In response to the input of the character "w", the user terminal 3 firstly transmits the character "w" as an input character into the search bar p1 at this point. Then, in response to the input of the character "q", the user terminal 3 transmits the characters "wq" as the input character into the search bar p1 at this point.

As described above, the input character receiving processing unit F1 receives each input character transmitted by the user terminal 3 each time a character is inputted.

In this example, an input operation of a character string includes an operation to delete a character from a character string in the search bar p1. For example, assume a case where "wq" is inputted as a character string and then a deletion operation of "q" is conducted. Each of the input operation of "w", the input operation of "q", and the deletion operation of "q" is treated as a character input. That is, as an input character transmitted from the user terminal 3, "w" is firstly transmitted, then "wq" is transmitted, and lastly "w" is transmitted again with the "q" deleted.

Further, in case of a language with multiple character types, such as Japanese (namely hiragana, katakana, and Chinese characters), a character type conversion operation to an input character in the search bar p1 is also included in an input operation. For example, assume a case where alphabet characters "n", "o", "r", and "i" are inputted in this order in a roman alphabet input mode, and the input character in the search bar p1 is converted to hiragana "no-ri", which is composed of two hiragana characters. The user terminal 3 transmits "no-ri" as an input character. Accordingly, as a suggest word display which will be described later, homonyms of "no-ri", such as a word meaning "seaweed" and a word meaning "glue", which are distinguished in Chinese character representation, are displayed. In this case, further assume that a user performs a character type conversion operation on hiragana "no-ri" in the search bar p1 and converts the input character into Chinese characters "NO-RI (seaweed)", consisting of two Chinese characters. The conversion operation is also treated as an input operation of a character, and the input character "NO-RI (seaweed)" is transmitted to the shopping server 10. Accordingly, as a suggest word display which will be described later, a suggest word including "NO-RI (glue)" is not displayed, but a suggest word including "NO-RI (seaweed)" is displayed.

In FIG. 3, the suggest word extracting processing unit F2 extracts a suggest word that matches an input character received by the input character receiving processing unit F1, from suggest word management information I1 that stores a plurality of suggest words.

Figure 5:
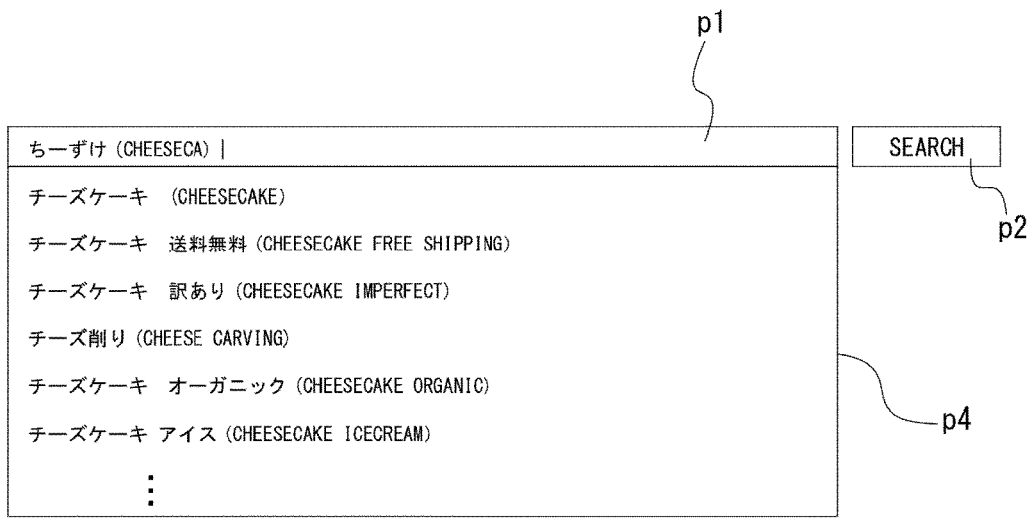
FIG. 5 is an explanatory diagram illustrating an exemplary display of a suggest word.

FIG. 5 illustrates an exemplary display of a suggest word.

As illustrated in FIG. 5, a suggest word in this example is displayed in a suggestion column p4 which appears on the lower side of the search bar p1 in response to character input into the search bar p1. In FIG. 5, an exemplary display of suggest words in the suggestion column p4 that matches an input character "cheeseca" inputted into the search bar p1 is illustrated.

FIG. 6 illustrates an example of the suggest word management information I1 stored in the suggest word DB 15.

In the suggest word management information I1, a plurality of suggest words are stored. Furthermore, pronunciation information, a count of searches, and a display priority degree for each suggest word are corresponded to each suggest word.

In the suggest word management information I1, the pronunciation information is employed to search for a suggest word based on characters inputted by a user. For example, to a suggest word "cheesecake", pronunciation information "chiizukeeki" in Japanese reading is corresponded.

The count of searches is a count of times when a corresponding suggest word is employed for a product search. As described above, when a displayed suggest word is selected by a user, a product search specifying the selected suggest word as a search query is conducted. As described above, the count of searches is information representing the count of times when a suggest word is selected by a user and employed as a search query for a product search. In this example, the count of searches is counted by the shopping server 10, for example, by incrementing the value of the count of searches corresponding to a suggest word in the suggest word management information I1, each time a product search specifying the selected suggest word by the selection of the displayed suggest word as a query is executed.

The display priority degree is information representing the priority of display when displaying a suggest word. A suggest word with a higher display priority degree is displayed to a user prior to suggest words with lower priority degrees. For the display priority degree in this example, a higher degree of priority is represented by a higher value. By each search, the display priority degree is calculated and updated based on information on the count of searches. For example, calculation is configured to give a higher display priority degree to a suggest word with a greater count of searches. Alternatively, the value of the display priority degree may be calculated based on not only the count of searches, but also on other indexes. In this example, calculation and update of the display priority degree is performed by the shopping server 10.

Based on the above suggest word management information I1, the suggest word extracting processing unit F2 described in FIG. 3 extracts a suggest word matching an input character received by the input character receiving processing unit F1. In this example, when a character type conversion has not been conducted, the suggest word extracting processing unit F2 acquires pronunciation information of a received input character. Then, from the suggest words stored in the suggest word management information I1, the suggest word extracting processing unit F2 extracts a suggest word corresponded to pronunciation information having a matching prefix with the acquired pronunciation information.

When a character type has been converted, the suggest word extracting processing unit F2 extracts a suggest word having a matching prefix with the converted input characters received after the character type conversion, thus targeting a suggest word instead of pronunciation information of the suggest word. Thus, the suggest word extracting processing unit F2 can respond to a case where the above-described hiragana "no-ri" is converted to Chinese character "NO-RI (seaweed)", and avoid displaying a suggest word including "NO-RI (glue)".

Meanwhile, the suggest word extracting processing unit F2 may acquire pronunciation information of a received input character and extract a suggest word based on the acquired pronunciation information, even when a character type has been converted. In this case, an extraction result of a suggest word may be a combination of an extraction result of a suggest word based on the received input character (type-converted character) and an extraction result of a suggest word based on the pronunciation information. Accordingly, even when a user makes a mistake in character type conversion, display of a homonym suggest word with a relatively high display priority degree can be configured (as will be described later, suggest words ranking from first to "x"-th in the display priority degree are displayed). Thus, for example, even when converting hiragana "no-ri" to a combination of a Chinese character and a hiragana character "NO-ri (to ride)" by mistake instead of "NO-RI (seaweed)" or "NO-RI (glue)", display of a suggest word corresponding to "NO-RI (seaweed)" or "NO-RI (glue)" can be configured. Similarly in a case where a shopping site is a site mainly dealing in food, even when hiragana "no-ri" is converted to "NO-RI (glue)" by mistake instead of "NO-RI (seaweed)", display of a suggest word corresponding to "NO-RI (seaweed)" can be configured.

In addition, in a case where a suggest word is extracted based on both a converted character and pronunciation information after type conversion has been conducted as described above, a suggest word extracted based on the converted character may be rendered higher display priority degree (the display priority degree referred to in re-extraction described later). Accordingly, when a converted character is "NO-RI (seaweed)", a suggest word corresponding to "NO-RI (seaweed) is displayed prior to a suggest word corresponding to "NO-RI (glue)".

In this example, regarding a suggest word extracted by a matching prefix condition described above, the suggest word extracting processing unit F2 performs re-extraction as necessary, considering the maximum count of suggest word displays "x" in the suggestion column p4. In this example, the maximum count of suggest word display "x" in the suggestion column p4 is set at "10". Thus, when the count of suggest words extracted by an extracting process on the above matching prefix condition exceeds "10", the suggest word extracting processing unit F2 performs the re-extraction of a suggest word. The re-extraction in this case is performed based on a display priority degree corresponded to each extracted suggest word. Specifically, top 10 suggest words in the display priority degree are re-extracted.

The suggest word extracting processing unit F2 performs an extracting process of a suggest word, including the above re-extraction, each time a new input character is received by the input character receiving processing unit F1.

For at least one suggest word extracted by the suggest word processing unit F2, the shop extracting processing unit F3 illustrated in FIG. 3 extracts a shop associated with a keyword obtained from the suggest word, based on keyword-shop correspondence information I2 in which a keyword and a shop are corresponded to each other. In this example, the shop extracting processing unit F3 extracts a shop associated with a keyword obtained from a suggest word with the top display priority degree, from the suggest words extracted by the suggest word extracting processing unit F2.

As will be described below, according to the present embodiment, along with a suggest word extracted by the suggest word extracting processing unit F2, information concerning a shop extracted by the shop extracting processing unit F3 (for example, name information of the shop and a logo image of the shop: hereinafter referred to as "shop information") is displayed in the web page wp.

In this case, the shop information displayed along with a suggest word functions as an advertisement of the shop.

In this example, an operator of a shopping site sells to shops some suggest words as keywords to display the above shop advertisement, among suggest words stored in the suggest word management information I1.

In the shopping site operation system 5, the keyword DB 16 is configured to store management information; the information which store has purchased which keyword (suggest word), as keyword-shop correspondence information I2.

FIG. 7 illustrates an example of the keyword-shop correspondence information I2 stored in the keyword DB 16.

As illustrated, in the keyword-shop correspondence information I2, suggest words, such as "cheesecake", "cheese carving" . . . , and "tote bag", are stored as keywords. Further, to each of these keywords, a shop ID of a shop that has purchased the keyword is corresponded.

In this example, an identical keyword may be purchased by more than one shop. Thus, multiple shop IDs are corresponded to each of the keywords "cheesecake", "cheese carving", and "tote bag" in the figure.

Based on the above keyword-shop correspondence information I2, the shop extracting processing unit F3 illustrated in FIG. 3 extracts a shop associated with a keyword obtained from a suggest word with the top display priority degree, among suggest words extracted by the suggest word extracting processing unit F2.

Regarding the shops extracted as described above, the shop extracting processing unit F3 in this case performs re-extraction as necessary, considering a maximum count of shop information displays "m" in the web page wp. In this example, the count of shop information display frames in the web page wp is, as will be described later, set at "5" (m=5). Thus, when the count of shops, which have been extracted based on the above extracted suggest word and the keyword-shop correspondence information I2, is greater than "5", the shop extracting processing unit F3 re-extracts five shops. In this example, the above described re-extraction of an identical count of shops to the count of shop information display frames is conducted as random extraction. In other words, an identical count of shops to the count of shop information display frames are extracted at random.

The display control processing unit F4 controls to display a suggest word extracted by the suggest word extracting processing unit F2, and to display information concerning a shop extracted by the shop extracting processing unit F3

(shop information) as a search button for instructing execution of a search that is based on a keyword and targeting the shop as a search domain.

Figure 8:
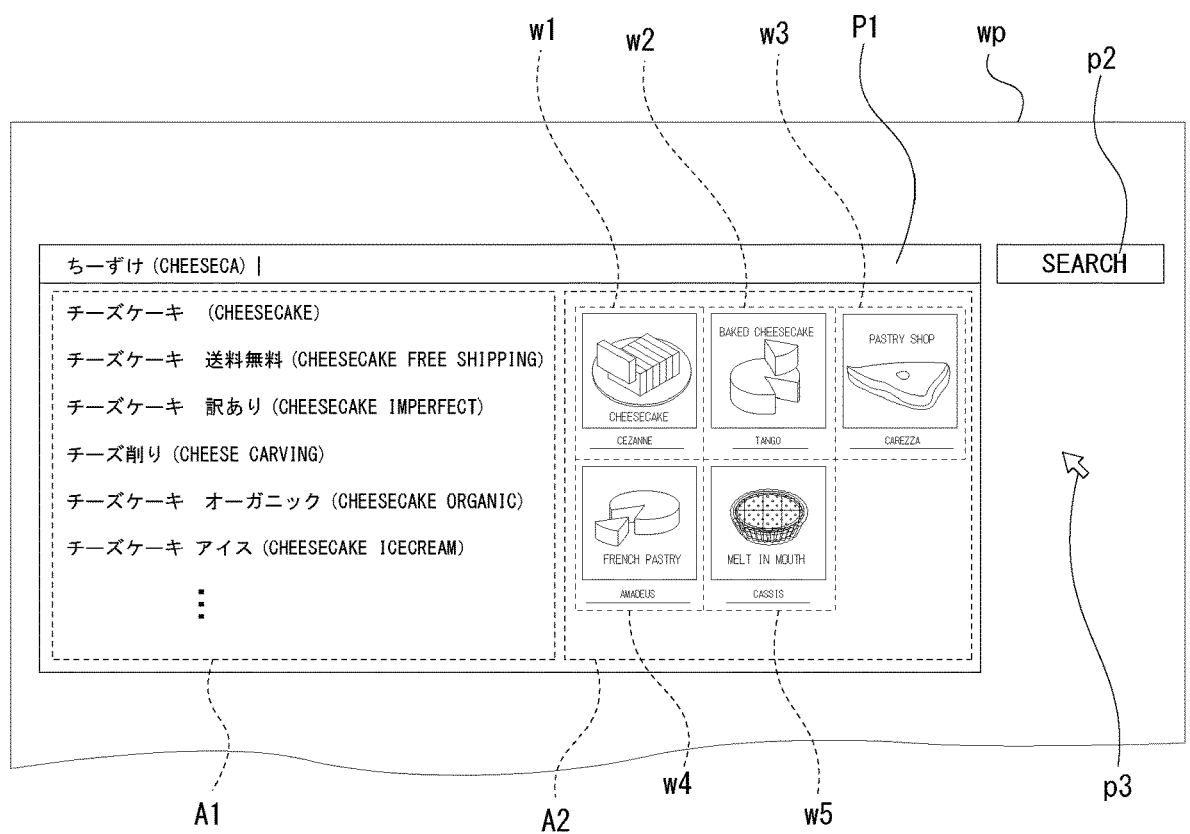
FIG. 8 is a diagram illustrating an exemplary display of a suggest word and shop information according to a first embodiment.

In FIG. 8, a display example of suggest words and shop information under a state where an input character in the search bar p1 is "cheeseca" is illustrated.

As illustrated, a suggestion column p4 in the web page wp includes a suggest word display area A1 and a shop information display area A2. The suggest word display area A1 is for displaying a suggest word, and the shop information display area A2 is for displaying shop information. In this example, dividing the suggestion column p4 into two sides, the suggest word display area A1 occupies the left side and the shop information display area A2 occupies the right side.

In the suggest word display area A1, the maximum count of suggest word display "x" is set at, for example, "10", and a suggest word with a higher display priority degree is placed at a higher position. In an example illustrated as FIG. 8, corresponding to input characters "cheeseca", suggest words displayed in the suggest word display area A1 from the top are; "cheesecake", "cheesecake free shipping", "cheesecake imperfect", "cheese carving", "cheese organic", "cheesecake ice", and the like.

The shop information display area A2 includes at least one display frame w to display shop information. In this example, as described above, the count of display frames w is set at "5" (each display frame is shown as a display frame from w1 to w5), and the maximum display count of shop information "m" is "5".

The display control processing unit F4 performs a process of acquiring as shop information the information concerning a shop extracted by the shop extracting processing unit F3. Specifically, in this example, based on the information of a shop ID extracted by the shop extracting processing unit F3, the display control processing unit F4, among registered information of the corresponding shop stored in the shop DB 14, acquires at least name information of the shop and a logo image of the shop as shop information.

Next, the display control processing unit F4 transmits to the user terminal 3 a suggest word extracted by the suggest word extracting processing unit F2 and the display priority degree of the suggest word along with the shop information acquired as described above. Then, the display control processing unit F4 displays the suggest word and the shop information in the web page wp.

Following a source code written in the web page wp, such as a Java (R) script or similar script, the user terminal 3 at this processing performs a process of displaying the received suggest words in the suggest word display area A1 in an order according to the display priority degree, and of displaying the received shop information in each of display frames w in the shop information display area A2.

Besides, the display control processing unit F4 also transmits to the user terminal 3 a keyword corresponded to an extracted shop (in this example, a word identical to a suggest word with the top display priority degree), so that the transmitted shop information is displayed as a search button. The search button is for instructing execution of a search that is based on the keyword and targets the shop as a search domain.

Following the source code written in the web page wp, in response to a user operation of selecting the shop information displayed in any of display frames w, the user terminal 3 is configured to transmit a search request to the search device 11. The search request instructs execution of a product search targeting the shop (the shop whose shop information has been selected) as a search domain and employing the received keyword as a search query. That is, shop information is displayed as a search button for instructing a search that is based on a keyword and targets the shop as a search domain.

In this case, a selection operation of a display frame w refers to, for example, a mouse click operation under a condition that a pointer p3 is positioned over the display frame w by a mouse operation. Alternatively, when input through a touch panel operation is possible, the selection operation may be a touch operation on the display frame w in a predetermined manner.

At this point, in this example, as a "search request" in response to the selection of shop information, the user terminal 3 transmits a search request instructing a Boolean ("and") search employing a received keyword and the name information of a shop whose shop information has been selected.

In response to the transmission of the above-described search request by the user terminal 3, the search device 11 performs a product search according to the search request, based on the storage information in the product DB 13, and transmits a web page showing a result of the product search (a search result page) to the user terminal 3. Accordingly, in the user terminal 3, a result of a product search targeting a shop whose shop information has been selected as a search domain is displayed to a user, as a result of a product search employing a keyword, that is, a suggest word with the top display priority degree.

1-4. Processing Procedure

Figure 9:
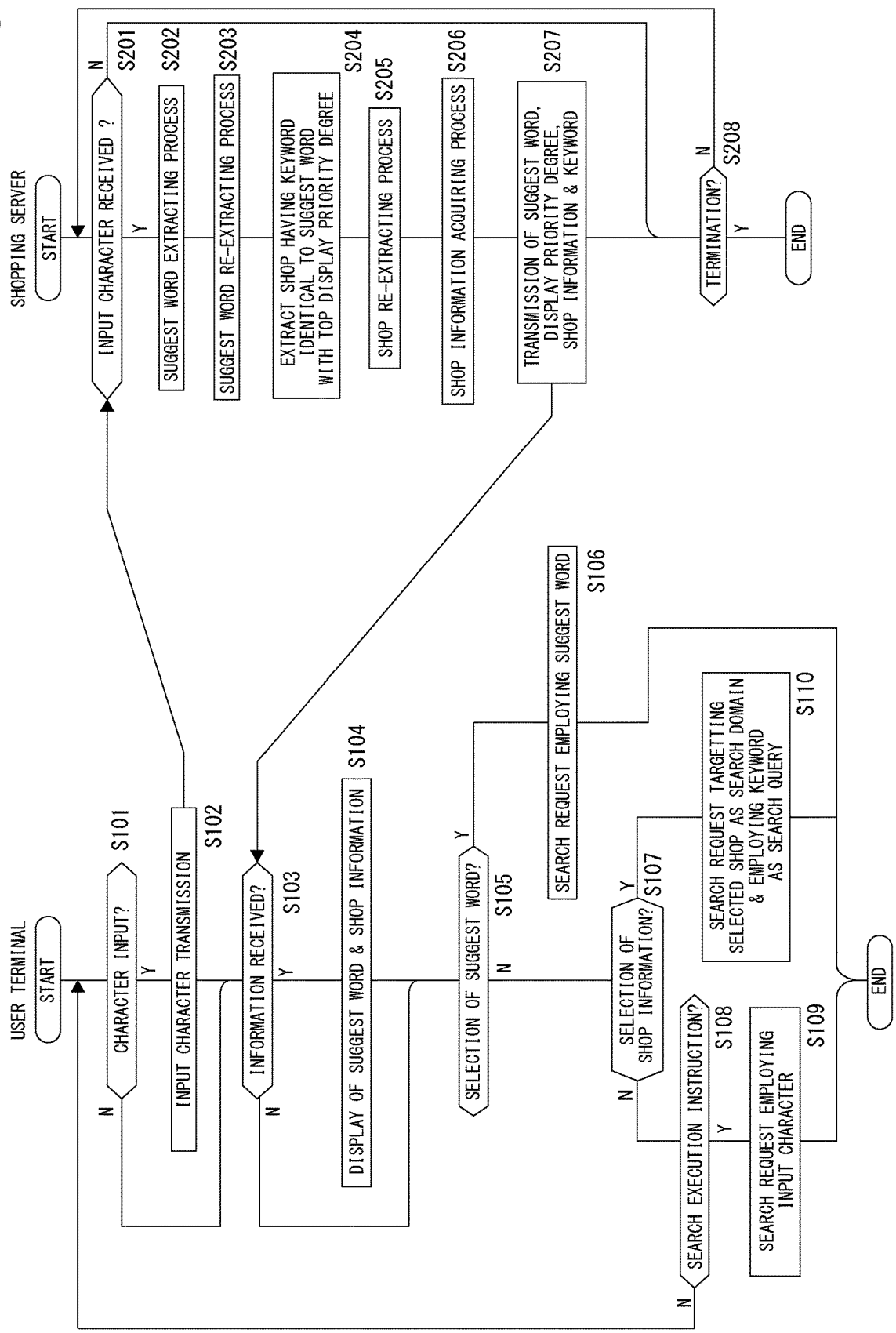
FIG. 9 is a flowchart illustrating processing procedure to implement functions according to the first embodiment.

With reference to the flowchart in FIG. 9, the following describes the processing procedure to implement functions of the input character receiving processing unit F1, the suggest word extracting processing unit F2, the shop extracting processing unit F3, and the display control processing unit F4 as described above.

In FIG. 9, processes illustrated to be performed by a "user terminal" are the processes performed by the CPU 101 of the user terminal 3 based on a source code written in the web page wp. Similarly, processes illustrated to be performed by a "shopping server" are the processes performed by the CPU 101 of the shopping server 10, based on a program stored in a predetermined recording medium, such as the ROM 102 or the like.

As the processing illustrated in FIG. 9 is started, it is assumed that the user terminal 3 has displayed already the web page wp, which has been received in response to a request to the shopping server 10.

First, the CPU 101 of the user terminal 3 determines whether or not character input is performed by a user at Step S101. As understood from the above description, an input operation targeted at Step S101 in this example includes an input operation of one character into the search bar p1, a deletion operation of an inputted character, and a conversion operation of a character type. At Step S101, when any of these input operations is performed, the CPU 101 of the user terminal 3 determines that the character input is performed.

When determining that the character input is performed at Step S101, the CPU 101 of the user terminal 3 proceeds to Step S102 and transmits an input character in the search bar p1 to the shopping server 10. Then, the CPU 101 of the user terminal 3 proceeds to Step S103.

Meanwhile, when determining the character input is not performed at Step S101, the CPU 101 of the user terminal 3 skips Step S102 and proceeds to Step S103.

At Step S201, the CPU 101 of the shopping server 10 determines whether or not the input character transmitted from the user terminal 3 at above Step S102 is received.

When determining that the input character is not received, the CPU 101 of the shopping server 10 proceeds to Step S208 and determines whether or not a termination condition of processing is satisfied. The termination condition of processing in this case is, for example, closing of the web page wp in the user terminal 3, or communication failure with the user terminal 3.

When determining that the termination condition of processing is not satisfied, the CPU 101 of the shopping server 10 returns to Step S201 and determines again whether or not an input character is received.

When determining that an input character is received, the CPU 101 of the shopping server 10 proceeds to Step S202 and performs a suggest word extracting process. The suggest word extracting process is a process of extracting a matching suggest word from the suggest word management information I1, based on the input character (characters prior to type conversion or type-converted characters) received at Step S201. As details on the process is described above as the extracting process by the suggest word extracting processing unit F2, an overlapping explanation is omitted.

After performing the suggest word extracting process at Step S202, the CPU 101 of the shopping server 10 performs a suggest word re-extracting process at Step S203. As the re-extracting process is also described above as the re-extracting process by the suggest word extracting processing unit F2, an overlapping explanation is omitted.

At subsequent Step S204, the CPU 101 of the shopping server 10 performs an extracting process of a shop associated with a keyword obtained from suggest word with the top display priority degree. That is, after acquiring, as a keyword, a suggest word with the top display priority degree from the suggest words extracted in the re-extracting process at Step S203 (10 words at most, in this example), the CPU 101 of the shopping server 10 extracts a shop ID corresponded to the acquired keyword from shop IDs stored in the keyword-shop correspondence information I2 in the keyword DB 16.

At subsequent Step S205, as a shop re-extracting process, the CPU 101 of the shopping server 10 performs a process of extracting, for example, at random, a corresponding count of shop IDs to the count of display frames w (5 in this example) in the web page wp, from the shop IDs extracted at Step S204.

As understood from above, shop extraction at this step is performed when the CPU 101 of the shopping server 10 determines whether or not the count of shops extracted at Step S204 (the count of shop IDs) is greater than the count of display frames w, and further determines that the count of shops is greater than the count of display frames w.

After performing the shop re-extracting process at Step S205, the CPU 101 of the shopping server 10 performs a shop information acquiring process at Step S206. As the shop information acquiring process, based on the shop IDs extracted through Steps S204 and S205 (5 IDs at most in this example), the CPU 101 of the shopping server 10 acquires, as shop information, at least name information of the shop and a logo image of the shop from registration information of the corresponding shop stored in the shop DB 14.

At subsequent step S207, the CPU 101 of the shopping server 10 performs a process of transmitting to the user terminal 3 a suggest word, a display priority degree, shop information and a keyword. Specifically, the CPU 101 of the shopping server 10 performs a process of transmitting to the user terminal 3, the suggest word and its display priority degree extracted through Steps S202 and S203, the shop information acquired at Step S206, and the keyword (a suggest word with the top display priority degree) acquired by the re-extracting process at Step S204.

As described above, in this example, a transmission of the shop information and the keyword to the user terminal 3 by the shopping server 10 enables display of the shop information as a search button, such that instructs execution of a search targeting the shop as a search domain and employing the keyword as a search query.

After performing the transmitting process at Step S207, the CPU 101 of the shopping server 10 proceeds to above Step S208 and determines whether or not the termination condition is satisfied. As described above, when the termination condition is not satisfied, the CPU 101 of the shopping server 10 returns to Step S201. When the termination condition is satisfied, the CPU 101 of the shopping server 10 terminates the processing described in the figure.

At Step S103, the CPU 101 of the user terminal 3 determines whether or not respective information transmitted by the shopping server 10 at Step S207 (a suggest word, a display priority degree, shop information, and a keyword) is received.

When determining that the above respective information is received, the CPU 101 of the user terminal 3 proceeds to Step S104 and performs a display process of the suggest word and the shop information. That is, the CPU 101 of the user terminal 3 performs a process of displaying one or a plurality of suggest words following an order of the display priority degree in the suggest word display area A1 in the suggestion column p4, and of displaying shop information in display frames w in the shop information display area A2 in the suggestion column p4.

After performing the display process at Step S104, the CPU 101 of the user terminal 3 proceeds to Step S105.

Meanwhile, when determining that the respective information is not received at Step S103, the CPU 101 of the user terminal 3 skips Step S104, and proceeds to Step S105.

When determining that a selection operation of a displayed suggest word is performed, the CPU 101 of the user terminal 3 proceeds to Step S106 and transmits to the search device 11 a search request, such that instructs execution of a product search employing as a search query the suggest word on which the selection operation is performed, as a search request by a suggest word. Then, the CPU 101 of the user terminal 3 terminates the processing described in the figure.

Accordingly, for example, when a selection operation of a suggest word "cheesecake imperfect" is performed in the example of FIG. 8, a product search employing "cheesecake imperfect" as a search query is executed in the search device 11. Then, a search result page showing the result is transmitted to the user terminal 3 and is displayed to a user.

Meanwhile, when determining that a selection operation of a displayed suggest word is not performed, the CPU 101 of the user terminal 3 proceeds to Step S107 and determines whether or not a selection operation of the displayed shop information is performed. When determining that a selection operation of the displayed shop information is not performed, the CPU 101 of the user terminal 3 proceeds to Step S108 and determines whether or not a search execution instruction is performed, that is, determines whether or not an operation instructing execution of a product search employing an input character into the search bar p1 as a search query, for example, a selection operation of the search button p2, is performed. When determining that the search execution instruction is not performed, the CPU 101 of the user terminal 3 returns to above Step S101 and determines again whether or not character input into the search bar p1 is performed.

Accordingly, in the user terminal 3, after the display of a suggest word and shop information at Step S104 in response to the character input into the search bar p1, a processing sequence of Steps from S101 to S105, S107, and S108 is repeated until any of the following operations is performed by a user: selection of a displayed suggest word, selection of shop information, or execution instruction of a product search employing an input character into the search bar p1. That is, a suggest word and shop information in display can be switched in accordance with a change in an input character into the search bar p1.

When determining that a search execution instruction is performed at Step S108, the CPU 101 of the user terminal 3 proceeds to Step S109, and transmits to the search device 11 a search request for a search employing an input character into the search bar p1, specifically, a search request that instructs a product search employing the input character as a search query. Then, the CPU 101 of the user terminal 3 terminates the processing illustrated in the figure.

Meanwhile, when determining that the operation of selecting a displayed shop information is performed at Step S107, the CPU 101 of the user terminal 3 proceeds to Step S110, and transmits to the search device 11 a search request for a search targeting the selected shop as a search domain and employing a keyword as a search query. Then, the CPU 101 of the user terminal 3 terminates the processing illustrated in the figure. As understood from above description, a search request performed at Step S110 instructs a Boolean ("AND") search employing a keyword received from the shopping server 10 and name information of a shop whose shop information has been selected (in this example, received from the shopping server 10 as shop information).

Regarding purchase of a keyword by a shop, a case where no restriction is set for the maximum count of shops that can purchase an identical keyword, and thus the count of shops corresponded to an identical keyword may exceed the count of display frames w, is described above. However, the maximum count of shops that can purchase an identical keyword may be restricted to be equal to the count of display frames w, so that the count of shops corresponded to an identical keyword does not exceeds the count of display frames w.

Such restriction renders the process of re-extracting shops in consideration of the count of display frames w (Step S205) unnecessary, so that processing load of the shopping server 10 can be reduced.

In the above example, the shopping server 10 transmits to the user terminal 3 a keyword, apart from a suggest word extracted through Steps S202 and S203. However, the transmission of the keyword is not required.

In the first embodiment, in a case where the shopping server 10 does not transmits a keyword to the first embodiment, in a case where the shopping server 10 does not transmits a keyword to the user terminal 3, a suggest word corresponding to shop information for which a selection operation is performed, among suggest words received from the shopping server 10, may be employed as a search query, which is specified by a search request at Step S110 in the user terminal 3. That is, in this example, a suggest word with the top display priority degree may be employed.

This also applies to a fourth embodiment, which will be described later.

In the above example, when the shopping server 10 causes shop information to be displayed as a "search button", the shopping server 10 is configured to transmit a keyword (a suggest word) and the shop information to the user terminal 3 at the transmitting process of Step S207, assuming that the user terminal 3 is configured to transmit a search request at Step S110, based on the keyword (suggest word) and the shop information received from the shopping server 10, following a source code written in the webpage wp. However, a specific process to display shop information as a "search button" is not limited to the above process.

For example, the user terminal 3 may be configured (for example, following a source code written in the web page wp or the like) to notify the shopping server 10 of a shop whose shop information is selected, when any of displayed shop information is selected. With such configuration assumed, the shopping server 10 may cause the search device 11 to perform a search targeting the notified shop as a search domain and employing the suggest word corresponded to the notified shop as a search query, so that the displayed shop information is made to function as a "search button".

2. Second Embodiment 2-1. Overview of Functions Included in Information Processing Device According to Second Embodiment The following describes the second embodiment.

In the first embodiment, an example of selecting a suggest word for display from the suggest words extracted based on an input character into the search bar p1, such as a suggest word with the top display priority degree, and displaying shop information associated with a keyword obtained from the suggest word is described. In the second embodiment, an example of selecting more than one suggest word for display from the suggest words extracted based on an input character into the search bar p1, extracting shops associated with a keyword obtained from each suggest word, and displaying the shop information of each extracted shop is described.

In the second embodiment, the formation of the network system 1, the hardware configuration of each computer device forming the network system 1, and the layout of the web page wp (except for the count of display frames w) are identical to those described above. Thus, overlapping explanation is omitted. Similarly, the respective functions included in the shopping server 10 (F1 to F4) are identical to those described above, unless additional explanation is provided below. Thus, overlapping explanation is omitted.

Figure 10:
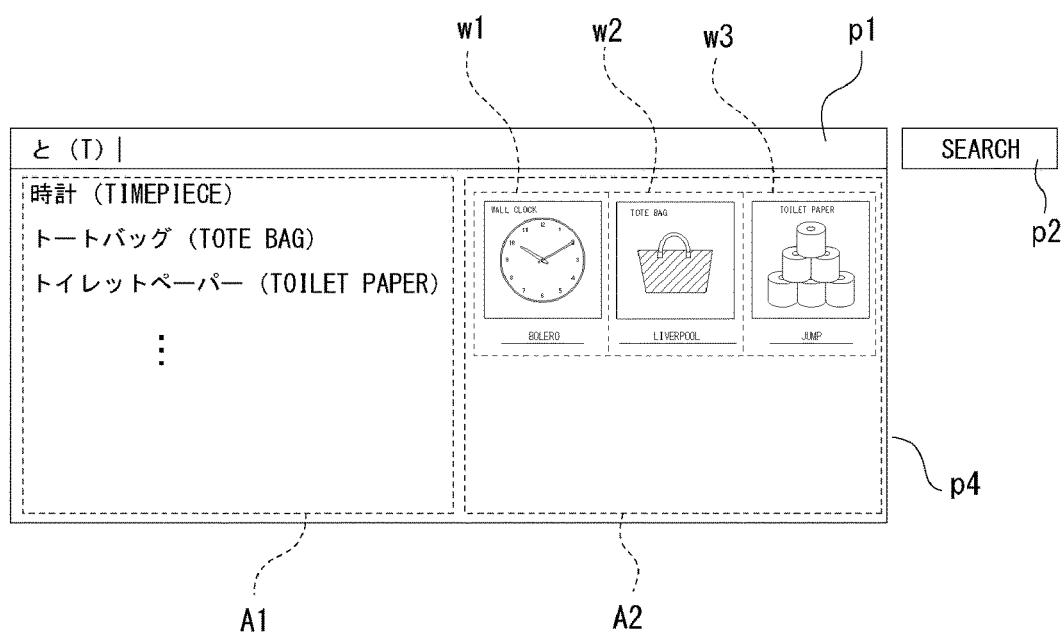
FIG. 10 is a diagram illustrating an exemplary display of a suggest word and shop information according to a second embodiment.

FIG. 10 is a diagram illustrating a display example of a suggest word and shop information in the second embodiment. In FIG. 10, only the search bar p1, the search button p2, and the suggestion column p4 in the web page wp are selectively illustrated.

For each of the suggest words ranking from first to "m"-th in display priority degree among the suggest words extracted based on an input character into the search bar p1, the shopping server 10 in the second embodiment performs a control of extracting a shop associated with a keyword obtained from each suggest word, of acquiring shop information corresponded to each extracted shop, and of displaying the acquired shop information.

FIG. 10 illustrates the following state as an example; in the suggest word display area A1, suggest words responding to an input character "t", specifically, "timepiece", "tote bag" and "toilet paper", are extracted and displayed in descending order according to the display priority degree. In the shop information display area A2, the shop information of the respective shops, that is, a shop associated with a keyword "timepiece" that ranks first in the display priority degree, a shop associated with a keyword "tote bag" that ranks second in the display priority degree, and a shop associated with a keyword "toilet paper" that ranks third in the display priority degree, is displayed.

In this example, the count of display frames w is set at 3 ("m"=3) in the shop information display area A2, so that the shop information of respective shops, specifically, a shop associated with a keyword obtained from a suggest word that ranks first in the display priority degree, a shop associated with a keyword obtained from a suggest word that ranks second in the display priority degree, and a shop associated with a keyword obtained from a suggest word that ranks third in the display priority degree, is to be displayed. Therefore, one shop for the suggest word at each rank needs to be extracted.

Accordingly, the shop extracting processing unit F3 in the second embodiment performs re-extraction of a shop in accordance with the count of display frames w as necessary, after extracting a shop associated with a keyword obtained from each of the suggest words ranking from first to third in the display priority degree, from suggest words extracted by the suggest word extracting processing unit F2. That is, in this example, for each of the suggest words ranking from first to third in the display priority degree, whether or not more than one shop is extracted is determined. When more than one shop is extracted for a suggest word (keyword), the shopping server 10 extracts one shop from the shops extracted as having a keyword identical to the suggest word.

As a process to re-extract a predetermined count of shops from extracted shops, random extraction may be adopted to this case as well.

2-2. Processing Procedure

Figure 11:
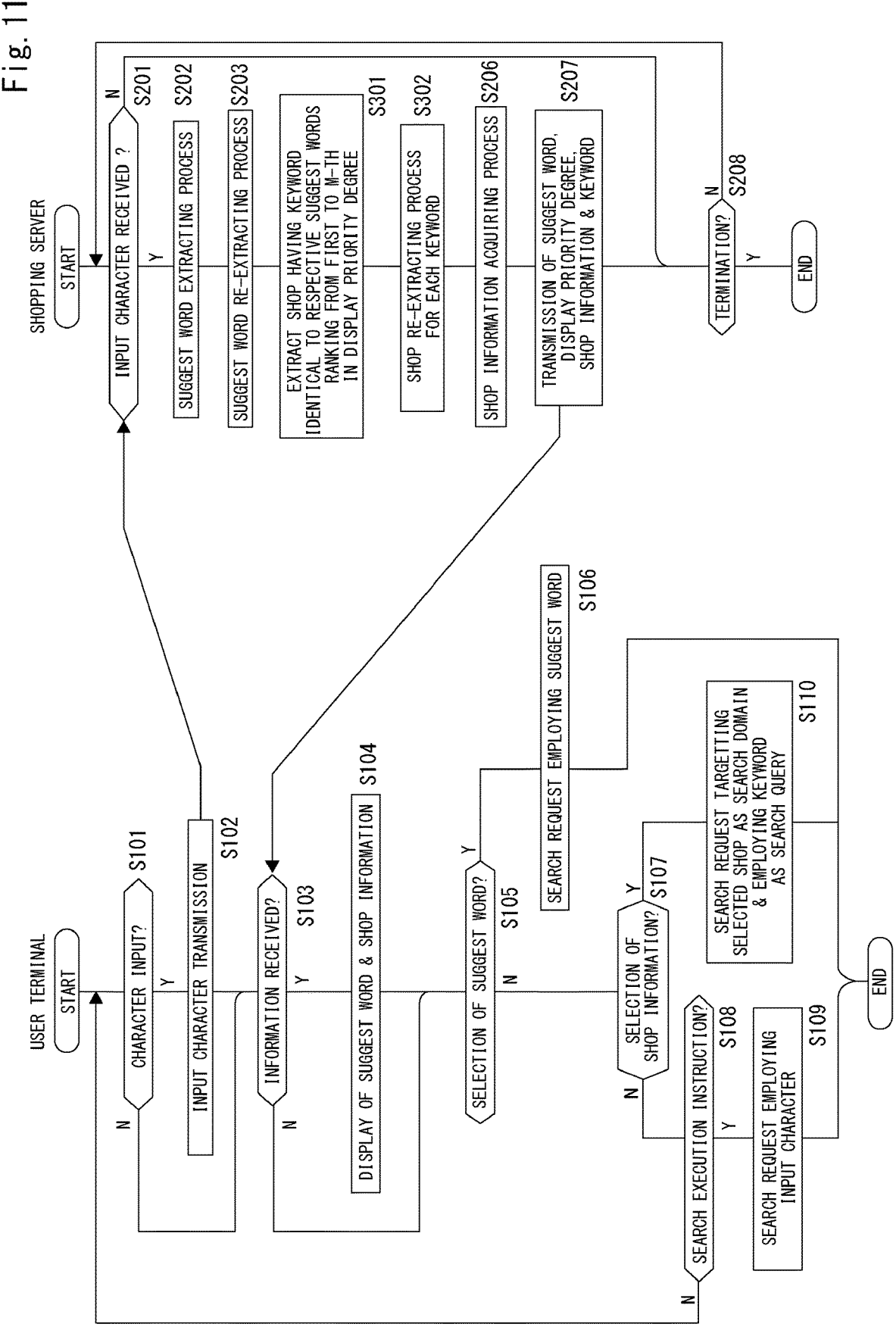
FIG. 11 is a flowchart illustrating processing procedure to be conducted to implement functions as the second embodiment.

With reference to the flowchart in FIG. 11, the following describes the processing procedure to implement functions as the second embodiment described above.

In the flowcharts to be described below, starting from FIG. 11 (specifically, FIG. 13 and FIG. 16), an identical step number is assigned to a process identical to the process that has been already described, and overlapping explanation is omitted.

In this flowchart, processes performed by the CPU 101 of the user terminal 3 are identical to those in the first embodiment.

Further, among the processes performed by the CPU 101 of the shopping server 10, the processes at Steps S201 to S203, and at Steps S206 to S208 are identical to those in the first embodiment.

In this flowchart, after performing the re-extracting process of a suggest word at Step S203, the CPU 101 of the shopping server 10 at Step S301 extracts a shop associated with a keyword obtained from respective suggest words ranking from first to "m"-th in the display priority degree. That is, in this case, based on the keyword-shop correspondence information I2 in the keyword DB 16, the CPU 101 of the shopping server 10 extracts a shop ID of a shop associated with a keyword obtained from respective suggest words ranking from first to third in the display priority degree, from suggest words extracted through Steps S202 and S203.

At subsequent step S302, the CPU 101 of the shopping server 10 performs a re-extracting process of a shop for each keyword (that is, for the respective suggest words ranking from first to "m"-th in the display priority degree). That is, in this example, the CPU 101 of the shopping server 10 determines, for the respective suggest words ranking from first to third in the display priority degree, whether or not more than one shop is extracted by the extracting process at Step S301. Then, for the suggest word (keyword) for which more than one shop is extracted, the CPU 101 of the shopping server 10 extracts one shop from the shops associated with a keyword obtained from suggest word.

After performing the re-extracting process at Step S302, the CPU 101 of the shopping server 10, as the shop information acquiring process at Step S206, acquires from the shop DB 13, the shop information for respective shop IDs extracted through above Steps S301 and S302. At this process, at least name information of a shop and a logo image of a shop are acquired in this case as well.

As the transmitting process at subsequent Step S207, the CPU 101 of the shopping server 10 transmits, to the user terminal 3, suggest words and their display priority degrees extracted through Steps S202 and S203, the shop information acquired at Step S206, and keywords (identical words to the respective suggest words ranking from first to "m"-th in the display priority degree).

In the second embodiment, a transmission of shop information and keywords to the user terminal 3 by the shopping server 10 enables the display of a plurality of extracted suggest words and the display of each shop information as a search button (a search button to instruct a search within the shop employing a keyword as a query).

Specifically, in the user terminal 3 in this case, as the display process at Step S104, a process to display suggest words in the suggest word display area A1 and shop information in the display frames w in the shop information display area A2, respectively, is performed, with the suggest word and the shop information transmitted from the shopping server 10 at above Step S207.

Then, when determining that a selection operation of the displayed shop information is performed at Step S107, the CPU 101 of the user terminal 3, as the search request process at Step S110, transmits to the search device 11 a search request to instruct execution of a product search targeting a selected shop (a shop whose shop information is selected) as a search domain and employing the keyword of the selected shop (a keyword purchased by the selected shop) as a search query.

A case where the count of display frames w assigned to each suggest word is restricted to one is described above. However, more than one display frame w may be assigned to each suggest word. In that case, an identical count of shops to the count of display frames w assigned to each suggest word may be re-extracted as the re-extracting processing at Step S302.

In the second embodiment, a transmission of a keyword to the user terminal 3 is not required as well. In the second embodiment, in a case where the shopping server 10 does not transmits a keyword to the user terminal 3, a suggest word corresponded to shop information for which a selection operation is performed, among the received suggest words ranking from first to "m"-th in the display priority degree, may be employed as a search query, which is specified by a search request at Step S110 in the user terminal 3.

3. Third Embodiment 3-1. Overview of Functions Included in Information Processing Device According to Third Embodiment In the third embodiment, under a situation where a plurality of suggest words extracted in response to an input character into the search bar p1 are displayed, when receiving a user instruction of a suggest word other than a suggest word displaying information concerning a shop, a control for displaying the shop information corresponded to the instructed suggest word in the web page wp is performed.

In the third embodiment, the formation of the network system 1, the hardware configuration of each computer device forming the network system 1, and the layout of the web page wp are identical to those described above as well. Thus, overlapping explanation is omitted.

Figure 12A:
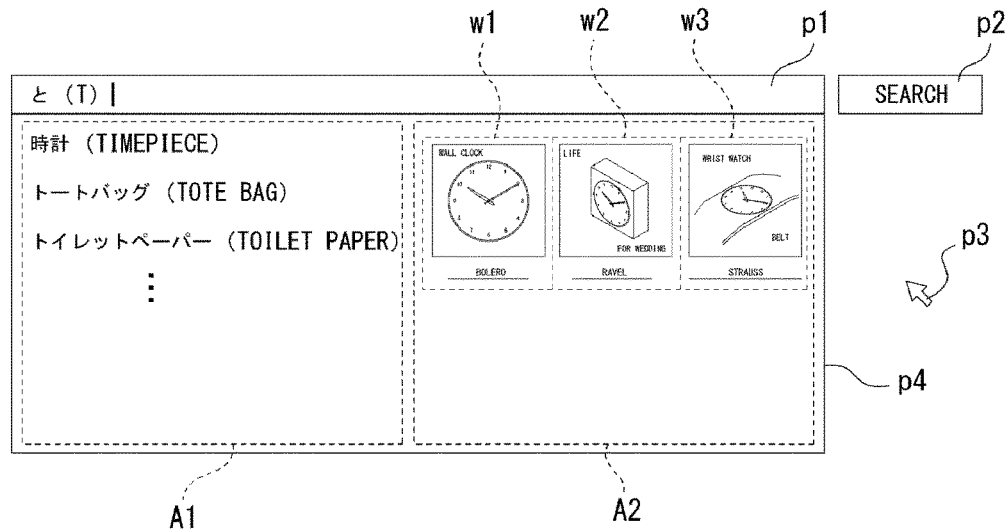
Figure 12B:
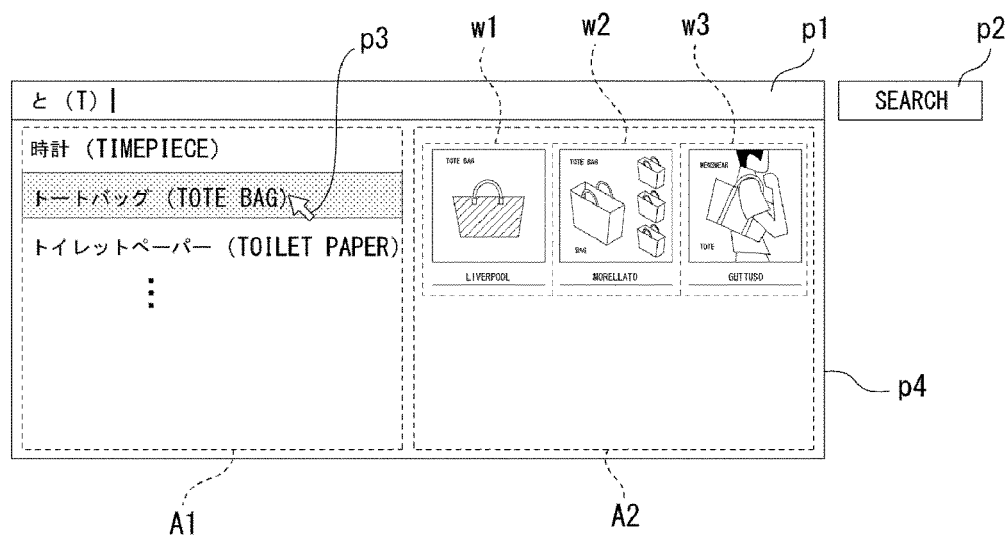
Figure 12C:
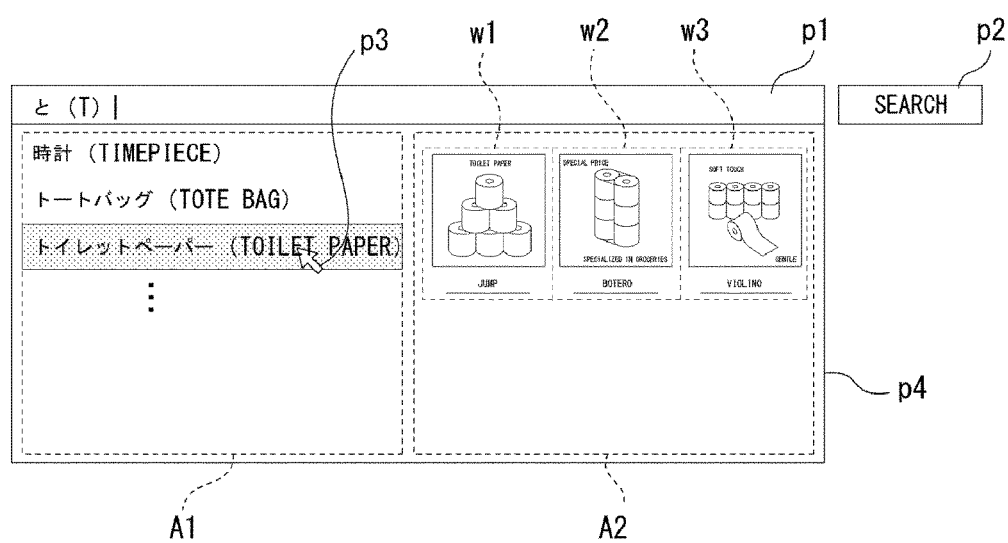

With reference to FIG. 12A, FIG. 12B, and FIG. 12C, the following describes transition example of display information in the web page wp in response to a suggest word instruction by a user.

FIG. 12A illustrates a state where suggest words "timepiece", "tote bag", and "toilet paper" are displayed in the suggest word display area A1 in descending order of the display priority degree, responding to a character input "t" into the search bar p1. In this example, the count of display frames w in the shop information display area A2 is set at 3 ("m"=3).

In the third embodiment, in response to the performance of character input into the search bar p1, shop information of a shop associated with a keyword obtained from a suggest word with top display priority degree among the suggest words extracted based on an input character is displayed in the shop information display area A2, as is the case of the first embodiment. Accordingly, as illustrated in FIG. 12A, shop information of shops associated with a keyword "timepiece", which is the suggest word with the top display priority degree is displayed to each display frame w1, w2, and w3.

With the above configuration, assume a transition from a state illustrated in FIG. 12A to a state illustrated in FIG. 12B, when a user instructs "tote bag", which is a suggest word ranking second in the display priority degree, in the suggest word display area A1. A suggest word instruction operation exemplified in the figure is a placing operation of the pointer p3 over the display area of a suggest word (a so-called mouseover operation). The suggest word instruction operation is not limited to the mouseover operation. Any operation distinguished from a suggest word selection operation (an operation to instructs a search execution employing a suggest word) may be assigned to the suggest word instruction operation. For example, in a case where a touch panel operation is enabled, a tapping operation (a single tap) on the display area of a suggest word may be set at a suggest word selection operation. Then, a suggest word instruction operation may be a multiple tapping operation on the suggest word display area within a predetermined duration, a touching operation lasting longer than a predetermined duration (a long touch operation), a swiping operation, and the like.

As described above, when a suggest word ranking second in the display priority degree is instructed by a user, the shop information corresponded to the suggest word ranking second is displayed in the shop information display area A2. In this example, in place of the shop information corresponded to the suggest word with the top display priority degree that has been displayed, the shop information corresponded to the instructed suggest word, that ranks second in the display priority degree, is displayed.

FIG. 12C illustrates a state transitioned from the state illustrated in FIG. 12B, after a suggest word ranking third in the display priority degree is newly instructed by a user.

In response to the new instruction of a suggest word ranking third in the display priority degree in the state where the shop information corresponded to a suggest word ranking second in the display priority degree is being displayed, the shop information corresponded to the instructed suggest word ranking third in the display priority degree is displayed in the shop information display area A2, in place of the displaying shop information corresponded to the suggest word ranking second in the display priority degree.

As described above, when a plurality of suggest words are displayed, in response to a user instruction of a suggest word other than a suggest word displaying the shop information, the shop information corresponded to the instructed suggest word is displayed in the third embodiment.

Further, in this example, the display of shop information in response to a user instruction of a suggest word as described above applies to every suggest word displayed in the suggest word display area A1. That is, when the maximum display count of suggest words in the suggest word display area A1 is "x" (in this example, x=10), a user instruction of any of the suggest words ranking from first to "x"-th causes the shop information corresponded to the instructed suggest word to be displayed to a user.

3-2. Processing Procedure

With reference to the flowchart in FIG. 13, the following describes the processing procedure to implement functions as the third embodiment described above. In this case as well, when receiving an input character from the user terminal 3 at Step S201, the CPU 101 of the shopping server 10 performs the extracting process at Step S202 and the re-extracting process at Step S203.

In this case, when determining that an input character is not received at Step S201, the CPU 101 of the shopping server 10 proceeds to a process at Step S404, which will be described later.

After performing the re-extracting process at Step S203 (where suggest words ranking up to "x"-th are extracted), the CPU 101 of the shopping server 10 in this case performs at Step S401 an extracting process of a shop associated with a keyword obtained from the respective extracted suggest words. That is, for each of the suggest words extracted through Step S202 and S203, the CPU 101 of the shopping server 10 extracts the shop ID of a shop associated with a keyword obtained from the suggest word, from the keyword DB 16.

Further, the CPU 101 of the shopping server 10 performs a re-extracting process of shops for the respective keywords at subsequent Step S402. In this example, the count of display frames w in the shop information display area A2 is set at 3 (m=3). Accordingly, at Step S402, the CPU 101 of the shopping server 10 firstly determines whether or not more than three shops are extracted for each of the keywords (each of the extracted suggest words) by the extracting process at Step S401, and then regarding a keyword for which more than three shops are extracted, extracts three shops from the shops associated with the keyword.

After performing the re-extracting process at Step S402, the CPU 101 of the shopping server 10 in this case performs the shop information acquiring process at Step S206. Then, at Step S403, the CPU 101 of the shopping server 10 performs a transmitting process, to the user terminal 3, of the suggest words, the display priority degrees, and the shop information and the keyword corresponded to a suggest word with the top display priority degree. That is, the CPU 101 of the user terminal 10 transmits to the user terminal 3 the suggest words and the display priority degrees extracted through Steps S202 and S203, the shop information of the shops associated with a keyword obtained from the suggest word with the top display priority degree among shop information acquired at Step S206, and the keyword (a word identical to the suggest word with a top display priority degree).

After performing the transmitting process at Step S403, the CPU 101 of the shopping server 10 proceeds to Step S404.

The CPU 101 of the user terminal 3 in this case performs the process at the Steps S101 to S103. Then, after receiving at Step S103 the information transmitted from the shop terminal 10 at above Step S403 or later-described Step S405, the CPU 101 of the user terminal 3 proceeds to Step S501.

At Step S501, the CPU 101 of the user terminal 3 determines whether or not the received information includes a suggest word, that is, whether or not the received information is the information transmitted by the shopping server 10 at above Step S403.

Specifically, the transmitting process at Step S403 is performed in response to a change in an input character into the search bar p1, that is, when a first character is inputted, or an input character is added, deleted, or type-converted. In other words, the determining process at Step S501 determines whether or not to display a new suggest word in the web page wp, responding to the above-described change in the input character into the search bar p1.

When determining that the received information includes a suggest word at Step S501, the CPU 101 of the user terminal 3 proceeds to Step S104, and performs the display process of the suggest word and the shop information. Then, the CPU 101 of the user terminal 3 proceeds to Step S503.

Meanwhile, when determining that the received information does not include a suggest word at Step S501, the CPU 101 of the user terminal 3 proceeds to Step S502 and performs an updating process of the displayed shop information. Then, the CPU 101 of the user terminal 3 proceeds to Step S503. The details on the updating process at Step S502 will be described later.

At Step S503, the CPU 101 of the user terminal 3 determines whether or not a suggest word other than the suggest word displaying shop information is instructed by a user. When determining that such suggest word is instructed by a user, the CPU 101 of the user terminal 3 proceeds to Step S504, and notifies the shopping server 10 of the instructed suggest word.

When determining that such suggest word is not instructed, the CPU 101 of the user terminal 3 proceeds to Step S105. The processes at Steps S105 to S110 are identical to those described above. Thus, overlapping explanation is avoided.

The CPU 101 of the shopping server 10 in this case determines at Step S404 whether or not the notification of a suggest word performed at above Step S504 is received.

When determining that the notification of a suggest word is not received, the CPU 101 of the shopping server 10 proceeds to Step S208, and determines whether or not the termination condition is satisfied. When determining that the termination condition is not satisfied, the CPU 101 of the shopping server 10 returns to Step S201. On the other hand, when determining that the termination condition is satisfied, the CPU 101 of the shopping server 10 terminates the processing illustrated in the figure.

Meanwhile, when determining that the notification of a suggest word is received, the CPU 101 of the shopping server 10 proceeds to Step S405 and transmits to the user terminal 3 the corresponding shop information and keyword. That is, among the shop information acquired at above Step S206, the CPU 101 of the shopping server 10 transmits to the user terminal 3 the shop information of a shop associated with a keyword obtained from the suggest word notified at Step S404 and the keyword (a word identical to the notified suggest word).

The transmission of shop information and a keyword (here, a word identical to the suggest word instructed by a user) to the user terminal 3 by the shopping server 10 enables display of the shop information as a search button to instruct a search targeting the shop as a search domain and employing the keyword as a search query.

After performing the transmitting process at Step S405, the CPU 101 of the shopping server 10 proceeds to above Step S208.

When the shop information and keyword transmitted at Step S405 is received, the user terminal 3 obtains a determination result that the received information does not include a suggest word, as a determination result at above Step S501. When the determination result that the received information does not include a suggest word is obtained at Step S501, the CPU 101 of the user terminal 3 performs a process of, based on the received shop information, updating the shop information being displayed in each display frame w in the shop information display area A2 until then, as a display shop updating process at Step S502. That is, in this example, the CPU 101 of the user terminal 3 performs a control for displaying the received shop information in place of the shop information being displayed until then.

With the above processing, the above function as the third embodiment, specifically, a function of, in response to a user instruction of a suggest word other than a suggest word displaying shop information, causing the shop information corresponded to the instructed suggest word to be displayed as a search button is enabled.

In the above example, configuration that shop information of a shop associated with a keyword obtained from a predetermined suggest word (a suggest word with the top display priority degree) is displayed in accordance with the change in an input character into the search bar p1 is assumed. Thus, shop information is displayed in the web page wp even when a user does not instruct any suggest word in the web page wp. However, configuration that no shop information is displayed in the web page wp until a user instruct a suggest word may be conceivable.

A transmission of a keyword to the user terminal 3 is not required in the third embodiment as well. In the third embodiment, in a case where the shopping server 10 does not transmits a keyword to the user terminal 3, as well as in the case of the first embodiment, a suggest word corresponded to shop information for which a selection operation is performed, among the received suggest words from the shopping server 10 may be employed as a search query, which is specified by a search request at Step S110 in the user terminal 3.

4. Fourth Embodiment 4-1. Overview of Functions Included in Information Processing Device According to Fourth Embodiment.

In the fourth embodiment, when displayed shop information is selected, as a search targeting the selected shop as a search domain, a search is executed employing a superordinate concept word of a keyword as a query.

In the fourth embodiment, the formation of the network system 1, the hardware configuration of each computer device forming the network system 1, and the layout of the web page wp are identical to those described above as well. Thus, overlapping explanation is omitted.

In this example, as a search targeting the shop whose shop information is selected as a search domain, a search employing a keyword as a query and a search employing a superordinate concept word of the keyword as a query are configured to be executed by the search device 11 and a search result page sp showing the results of both searches is displayed in the user terminal 3 to a user.

FIG. 14 illustrates an example of the search result page sp in this case. Prior to the state illustrated in FIG. 14, in the web page wp, which has been displayed before the transition to the search result page sp, "cheesecake" is displayed as a suggest word with the top display priority degree. In addition, a product search is executed by a user selection of shop information that has been displayed as having a keyword "cheesecake".

In this case, a keyword search result area B1 and a superordinate concept word search result area B2 are included in the search result page sp. The keyword search result area B1 is for displaying the result of a product search employing a keyword as a query. The superordinate concept word search result area B2 is for displaying the result of a product search employing a superordinate concept word as a query. In this example, the keyword search result area B1 and the superordinate concept word search result area B2 are positioned below the search bar p1 in the search result page sp, next to each other in a horizontal direction.

FIG. 14 illustrates an example where the superordinate concept word of the keyword "cheesecake" is "cake". Accordingly, in the keyword search result area B1, information (name information of a product, a price, a product image, and the like) related to each product hit by a product search employing "cheesecake" is arranged product by product in a vertical direction of the web page. Further, in the superordinate concept word search result area B2, information related to each product hit by a product search employing "cake" is arranged product by product in a vertical direction of the web page.

In the fourth embodiment, information representing correspondence between a keyword and its superordinate concept word is stored in a predetermined computer device on the network system 1, so that the superordinate concept word of a keyword can be acquired. Specifically, in this example, based on the keyword-shop correspondence information I2 to be stored in the keyword DB 16, information, as illustrated in FIG. 15, that additionally includes a corresponding superordinate concept word to each keyword (hereinafter referred to as "keyword-shop correspondence information I2'") is created and the information is stored in the keyword DB 16.

Based on the above keyword-shop correspondence information I2' stored in the keyword DB 16, the shopping server 10 in the fourth embodiment acquires a subordinate concept word of a keyword, along with extracting a shop associated with a keyword obtained from a suggest word.

4-2. Processing Procedure

With reference to the flowchart in FIG. 16, the following describes the processing procedure to implement functions as the fourth embodiment described above.

FIG. 16 illustrates the processing assuming the configuration that only the shop information of a shop associated with a keyword obtained from a suggest word with the top display priority degree is displayed as shop information, as is the case of the first embodiment.

The CPU 101 of the user terminal 3 in this case performs the processes at Steps S101 to S109, as is the case of the first embodiment.

Similarly, the CPU 101 of the shopping server 10 in this case performs the processes at Steps S201 to S205, as is the case of the first embodiment.

After performing the shop re-extracting process at Step S205, the CPU 101 of the shopping server 10 in this case performs at Step S601 a process of acquiring a superordinate concept word based on the above keyword-shop correspondence information I2'. That is, in this example, the CPU 101 of the shopping server 10 acquires the superordinate concept word of the suggest word with the top display priority degree that is extracted at Step S202.

After acquiring the superordinate concept word at Step S601, the CPU 101 of the shopping server 10 performs the shop information acquiring process at Step S206 (the process of acquiring the shop information of the shop extracted through Steps S204 and S205), and then performs a transmitting process at Step S602.

As the transmitting process at Step S602, the CPU 101 of the shopping server 10 transmits to the user terminal 3 the suggest word and its display priority degree extracted through Steps S202 and S203, the shop information acquired at Step S206, a keyword (in this example, a word identical to a suggest word with the top display priority degree), and the superordinate concept word acquired at Step S601.

Accordingly, a plurality of extracted suggest words can be displayed in the webpage wp, and each shop information of a shop extracted for the respective suggest words can be displayed in the webpage wp as a search button (in this example, a search button to instruct searches targeting the shop as a search domain and employing a keyword and a superordinate concept word as independent queries query each).

After determining that an operation to select shop information is performed at Step S107, the CPU 101 of the user terminal 3 in this case performs a search request process at Step S701. Then, the CPU 101 of the user terminal 3 terminates the processing illustrated in the figure.

As the search request process at Step S701, the CPU 101 of the user terminal 3 transmits a search request to instruct execution of product searches targeting the selected shop as a search domain and employing the keyword and superordinate concept word received from the shopping server 10 as independent queries Accordingly, both of the requested product searches are executed in the search device 11. Then, the search result page sp showing the results of both of the product searches is transmitted to the user terminal 3 and is displayed to a user.

The above example describes a case where, as a search within a shop performed in response to selection of displayed shop information, both of a product search employing a keyword as a query and a product search employing a superordinate concept word as a query are executed, and the results of both searches are displayed in the search result page sp. However, in the fourth embodiment, as the search within a shop performed in response to selection of displayed shop information, at least the product search employing a superordinate concept word as a query needs to be executed, and execution and display of a search result are not required for the product search employing a keyword as a query.

In the above example, only the shop information of a shop associated with a keyword obtained from a suggest word with the top display priority degree is displayed as shop information in the web page wp, as is the case of the first embodiment. However, the fourth embodiment may be applied to a case of the second embodiment, where shop information corresponding to each of a plurality of suggest words is displayed, and a case of the third embodiment, where shop information corresponded to a suggest word instructed by a user is displayed.

5. Summary of Embodiments

As described above, the information processing device (the shopping server 10) according to the embodiments includes an input character receiving unit (the input character receiving processing unit F1) and a suggest word extracting unit (the suggest word extracting processing unit F2). The input character receiving unit receives an input character into a search keyword input column provided in a web page each time a character is inputted.

The suggest word extracting unit extracts a suggest word matching the input character received by the input character receiving unit, from suggest word management information (I1) in which a plurality of suggest words are stored.

The information processing device according to the embodiments further includes a shop extracting unit (the shop extracting processing unit F3) and a display control unit (the display control processing unit F4). The shop extracting unit extracts a shop associated with a keyword obtained from at least one suggest word from the suggest words extracted by the suggest word extracting unit, based on keyword-shop correspondence information (I2 or I2') in which a keyword and a shop are corresponded to each other. The display control unit controls to display the suggest word extracted by the suggest word extracting unit and to display information concerning the shop extracted by the shop extracting unit, as a search button for instructing execution of a search that is based on the keyword and targets the shop as a search domain.

With the above configuration, in addition to a conventional function having steps of displaying suggest words, selecting one suggest word, and displaying a search result page based on the suggest word, a function having steps of displaying shops corresponded to displayed suggest words, selecting one shop, and displaying a search result page employing the suggest word targeting the selected shop as a search domain, is enabled. Since a shop may select any keyword (a suggest word) to be corresponded to the shop itself (that is, a keyword related to a product the shop intends to sell can be selected), an environment where the shop can more easily sell a product that the shop intends to sell can be provided. In other words, more sales opportunities can be provided for the shop. Besides, since information concerning a displayed shop (shop information) functions as a search button to obtain a result of a search based on a suggest word targeting the shop as a search domain, a user can easily get a display of a search result about a desired product in a desired shop, simply by selecting the displayed shop information. Compared with a conventional link to a representative page of the selected shop, a user can more easily purchase a product, since a trouble of inputting characters to search for a desired product is reduced.

Therefore, an effective electronic commercial environment where a shop can easily sell a product that the shop intends to sell and a user can more easily purchase a product can be provided.

Further, in the information processing device according to the embodiments, in a case where a count of shops associated with a keyword obtained from the suggest word is greater than a count of display frames for the information concerning the shop, the shop extracting unit extracts an equal count of shops to the count of display frames, from the shops associated with a keyword obtained from the suggest word.

Accordingly, a greater count of shops than the count of display frames in a web page may be corresponded to one keyword.

Thus, any count of shops may be corresponded to one keyword, when making correspondence between a shop and respective keywords.

Further, in the information processing device according to the embodiments, the shop extracting unit extracts at random an equal count of shops to the count of display frames.

Accordingly, different shops can be displayed to a user at different display occasions.

Thus, a variety of shops can be displayed to a user as shops related to a suggest word.

Further, in the information processing device according to the embodiment (the second embodiment), the shop extracting unit extracts respective shops associated with a keyword obtained from each of a plurality of suggest words extracted by the suggest word extracting unit, and the display control unit controls to display, as the search buttons, respective information concerning the respective shops extracted for each of the plurality of suggest words by the shop extracting unit.

A shop to display may be limited to, for example, a shop corresponded to a suggest word with a top display priority degree. However, a suggest word which a user looks for may rank third in the display priority degree. In such a case, a shop suggestion function is rendered less effective, if displaying only the shop corresponded to the suggest word with the top display priority degree. In this regard, display of a shop corresponded to each of a plurality of suggest words increases the likelihood of displaying a shop corresponded to a suggest word a user looks for.

Thus, the shop suggestion function can be rendered more effective.

Further, in the information processing device according to the embodiment (the third embodiment), the shop extracting unit extracts respective shops associated with a keyword obtained from each of a plurality of suggest words extracted by the suggest word extracting unit, and the display control unit controls to display the plurality of suggest words, and in response to a user instruction of a suggest word other than a suggest word that displays information concerning a shop among the plurality of displayed suggest words, and controls to display, as the search button, information concerning a shop that is extracted by the shop extracting unit regarding the instructed suggest word.

Accordingly, instead of fixedly suggesting a shop related to one suggest word among a plurality of displayed suggest words, a shop related to suggest words a user may have interest in is flexibly suggested.

Thus, the shop suggestion function can be rendered more effective.

Further, in the information processing device according to the embodiment (the fourth embodiment), the display control unit controls to, along with acquiring a superordinate concept word of a keyword corresponded to a shop extracted by the shop extracting unit, display information concerning the shop extracted by the shop extracting unit, as a search button for instructing execution of a search that is based on the superordinate concept word and targets the shop as a search domain.

Accordingly, when a suggested shop is selected, a search result of products related to a superordinate concept word of a keyword, which includes products related to the keyword, is displayed to a user. Thus, products dealt in a suggested shop, including not only products related to a keyword but also related products, can be displayed to a user in a broad range.

6. Program and Recording Medium

The shopping server 10 as embodiments of an information processing device according to the present invention is described above. The program of the embodiments is a program causing an information processing device (a CPU or the like) to execute the processing of the shopping server 10.

The program according to the embodiments is a program causing an information processing device to implement an input character receiving function, a suggest word extracting function, a shop extracting function, and a display control function. The input character receiving function is to receive an input character into a search keyword input column provided in a web page each time a character is inputted. The suggest word extracting function is to extract a suggest word matching the input character received by the input character receiving function, from suggest word management information in which a plurality of suggest words are stored. The shop extracting function is to extract a shop associated with a keyword obtained from at least one suggest word from the suggest words extracted by the suggest word extracting function, based on keyword-shop correspondence information in which a keyword and a shop are corresponded to each other. The display control function is to control to display the suggest word extracted by the suggest word extracting function and to display information concerning the shop extracted by the shop extracting function, as a search button for instructing execution of a search based on the keyword targeting the shop as a search domain.

That is, the program corresponds to a program causing an information processing device, such as the shopping server 10 and the like, to execute processing described with reference to FIG. 9, FIG. 11, FIG. 13, FIG. 16, and the like According to such program, an information processing device as the above shopping server 10 can be implemented.

Such program may be preliminarily stored in an HDD as a recording medium contained in an apparatus such as a computer device, a ROM in a microcomputer including a CPU, or the like. Alternatively, such program may be temporarily or permanently recorded (stored) in a removable recording medium, such as a semiconductor memory, a memory card, an optical disk, a magneto-optical disk, a magnetic disc, or the like. Such removable recording medium can be provided as so-called package software.

Further, such program can be installed from a removable medium to a personal computer or the like. Besides, such program can be downloaded from a download site via a network such as a LAN, the internet or the like.

7. Modifications

The present invention is not limited to the above-described embodiments, and diverse modifications may be conceivable.

For example, though omitted in the above description, products targeted in an electric commerce are not limited to substantial goods, but may be non-substantial goods that include an electronic book and variety of service such as travel service providing an accommodation, financial service and the like.

Further, the target of a "search" in the present invention is not limited to products as goods or service for sale, and may be goods or service not for sale.

An example of displaying a logo image of a shop (an image corresponded to a shop) and name information of a shop altogether in the display frame w is described above. However, only the logo image of the shop or only the name information of the shop may be displayed in the display frame w. Alternatively, "information related to a shop" other than above may be displayed.

Furthermore, the suggestion column p4 displaying a suggest word may be arbitrarily positioned in the web page wp. For example, the suggestion column p4 may appear above the search bar p1 instead of below.

In addition, a display method of shop information (information concerning a shop) is not limited to a method such that shop information is displayed within the suggestion column p4 along with a suggest word. Another method, such that shop information is displayed in a pop-up window overlaid on the web page wp, may be adopted. Shop information may be displayed to a user, at least with a suggest word.

REFERENCE SIGNS LIST 1 network system, 2 network, 3 user terminal, 4 shop terminal, 5 shopping site operating system, 10 shopping server, 11 search device, 12 member DB(database), 13 product DB, 14 shop DB, 15 suggest word DB, 16 keyword DB, 101 CPU, F1 input character receiving processing unit, F2 suggest word extracting processing unit, F3 shop extracting processing unit, F4 display control processing unit, p1 search bar (input column)

What is claimed is:

1. An information processing device comprising:
at least one memory operable to store program code; and
at least one processor operable to access said at least one memory and read said program code and operate as instructed by said program code, said program code comprising:
input character receiving code configured to cause at least one of said at least one processor to receive an input character into a search keyword input column provided in a web page each time a character is inputted;
suggest word extracting code configured to cause at least one of said at least one processor to extract a plurality of suggest words matching the input character, from suggest word management information in which the plurality of suggest words are stored;
shop extracting code configured to cause at least one of said at least one processor to extract respective shops associated with a keyword obtained from each of the plurality of suggest words, registration information of the respective shops including a shop identification (ID) for distinguishing between shops and logo images of the shops, based on keyword-shop correspondence information in which a keyword and a shop are corresponded to each other, the keyword being related to a product; and
display control code configured to cause at least one of said at least one processor to display the plurality of suggest words, and to display, as respective search buttons presented for a user's selection, a plurality of logo images of the respective shops corresponding to at least one of the plurality of suggest words, each of the plurality of logo images, when selected, causing execution of a search that is based on the keyword as a search query and targets a shop identified by a selected logo image as a search domain, and the respective shops comprising two or more shops that are associated with the same product, which is indicated by the keyword, wherein a plurality of web pages are respectively registered by a plurality of shops and uploaded to a website managed by the information processing device, and the execution of the search that targets the shop identified by the selected logo image as the search domain limits the search to be within a web page registered by the shop identified by the registration information corresponding to the selected logo image, and wherein the display control code causes at least one of said at least one processor to, prior to receiving a user command to execute a search based on the input character in the search keyword input column, display the plurality of suggest words in a suggest word display area in the web page and concurrently display the plurality of the logo images in a shop information display area in the web page.

2. The information processing device according to claim 1, wherein in response to a count of shops associated with the keyword obtained from each of the plurality of suggest words being greater than a count of display frames for information concerning shops, the shop extracting code causes at least one of said at least one processor to extract an equal count of shops to the count of display frames, from the shops associated with the keyword obtained from the each of the plurality of suggest words.

3. The information processing device according to claim 2, wherein the shop extracting code causes at least one of said at least one processor to extract at random the equal count of shops to the count of display frames.

4. The information processing device according to claim 1, wherein the display control code causes at least one of said at least one processor to, along with acquiring a superordinate concept word of a keyword corresponding to a shop extracted by the shop extracting code, display information concerning the shop, which is extracted by the shop extracting code, as a search button for instructing execution of a search that is based on the superordinate concept word and targets the shop as the search domain.

5. An information processing method causing an information processing device to execute:

receiving an input character into a search keyword input column provided in a web page each time a character is inputted;

extracting a plurality of suggest words matching the input character, from suggest word management information in which the plurality of suggest words are stored;

extracting respective shops associated with a keyword obtained from each of the plurality of suggest words, registration information of the respective shops including a shop identification (ID) for distinguishing between shops and logo images of the shops, based on keyword-shop correspondence information in which a keyword and a shop are corresponded to each other, the keyword being related to a product; and controlling to display the plurality of suggest words, and to display, as respective search buttons presented for a user's selection, a plurality of logo images of the respective shops corresponding to at least one of the plurality of suggest words, each of the plurality of logo images, when selected, causing execution of a search that is based on the keyword as a search query and targets a shop identified by a selected logo image as a search domain, and the respective shops comprising two or more shops that are associated with the same product, which is indicated by the keyword, wherein a plurality of web pages are respectively registered by a plurality of shops and uploaded to a website managed by the information processing device, and the execution of the search that targets the shop identified by the selected logo image as the search domain limits the search to be within a web page registered by the shop identified by the registration information corresponding to the selected logo image, and wherein the controlling comprises, prior to receiving a user command to execute a search based on the input character in the search keyword input column, displaying the plurality of suggest words in a suggest word display area in the web page and concurrently displaying the plurality of the logo images in a shop information display area in the web page.

6. A non-transitory computer readable medium storing a program for causing an information processing device to execute:

receiving an input character into a search keyword input column provided in a web page each time a character is inputted;

extracting a plurality of suggest words matching the input character, from suggest word management information in which the plurality of suggest words are stored;

extracting respective shops associated with a keyword obtained from each of the plurality of suggest words, registration information of the respective shops including a shop identification (ID) for distinguishing between shops and logo images of the shops, based on keyword-shop correspondence information in which a keyword and a shop are corresponded to each other, the keyword being related to a product; and controlling to display the plurality of suggest words, and to display, as respective search buttons presented for a user's selection, a plurality of logo images of the respective shops corresponding to at least one the plurality of suggest words, each of the plurality of logo images, when selected, causing execution of a search that is based on the keyword as a search query and targets a shop identified by a selected logo image as a search domain, and the respective shops comprising two or more shops that are associated with the same product, which is indicated by the keyword, wherein a plurality of web pages are respectively registered by a plurality of shops and uploaded to a website managed by the information processing device, and the execution of the search that targets the shop identified by the selected logo image as the search domain limits the search to be within a web page registered by the shop identified by the registration information corresponding to the selected logo image, and wherein the controlling comprises, prior to receiving a user command to execute a search based on the input character in the search keyword input column, displaying the plurality of suggest words in a suggest word display area in the web page and concurrently displaying the plurality of the logo images in a shop information display area in the web page.

7. The information processing device according to claim 1, wherein the keyword-shop correspondence information is stored in a keyword database (DB).

8. The information processing device according to claim 7, wherein the keyword-shop correspondence information indicates a purchase of each of keywords by at least one shop, and a shop ID of a given shop corresponds to a given keyword in the keyword-shop correspondence information stored in the keyword DB based on a purchase of the given keyword by the given shop.

9. The information processing device according to claim 1, wherein, when the plurality of suggest words are displayed to be selectable by a user and a suggest word among the plurality of suggest words is selected by the user, logo images of shops corresponding to the selected suggest word are displayed with the selected suggest word, and
wherein the search that is based on the keyword is not conducted in response to selection of the suggest word until one of the logo images is selected.

10. The information processing device according to claim 1, wherein the suggest word display area and the shop information display area are provided in a drop-down menu from the search keyword input column.

11. The information processing device according to claim 1, wherein the plurality of logo images comprise each logo image of a shop corresponding to each of the plurality of suggest words.

* * * * *